(12) United States Patent
Begin et al.

(10) Patent No.: US 7,954,830 B2
(45) Date of Patent: Jun. 7, 2011

(54) ICE TRANSPORT SYSTEM

(75) Inventors: Jason Ernest Begin, Mooresville, NC (US); Roddy Burgess, Charlotte, NC (US); Jacob Connelly, Concord, NC (US); Ian Westad Cunningham, Huntersville, NC (US); Joseph M. Sexton, Huntersville, NC (US); Michael P. Dawson, Huntersville, NC (US)

(73) Assignee: Rubbermaid Incorporated, Huntersville, NC (US)

( * ) Notice: Subject to any disclaimer, the term of this patent is extended or adjusted under 35 U.S.C. 154(b) by 178 days.

(21) Appl. No.: 12/389,327

(22) Filed: Feb. 19, 2009

(65) Prior Publication Data

US 2009/0206569 A1    Aug. 20, 2009

Related U.S. Application Data

(60) Provisional application No. 61/029,908, filed on Feb. 19, 2008.

(51) Int. Cl.
*B62B 3/04* (2006.01)

(52) U.S. Cl. ..................................... 280/47.35; 280/79.3

(58) Field of Classification Search ............... 280/47.35, 280/79.3, 47.17, 47.19, 47.26, 47.34, 79.11, 280/79.2, 79.5, 651; 220/263, 638, 772
See application file for complete search history.

(56) References Cited

U.S. PATENT DOCUMENTS

| 745,322 | A | * | 12/1903 | Burrough | 220/324 |
|---|---|---|---|---|---|
| 1,709,030 | A | * | 4/1929 | Manthei | 220/772 |
| 1,950,376 | A | * | 3/1934 | Ellsworth | 220/772 |
| 2,552,929 | A | * | 5/1951 | Bodkin | 220/766 |
| D164,328 | S |  | 8/1951 | Roop |  |
| 2,642,038 | A |  | 6/1953 | Howling et al. |  |
| 2,663,391 | A | * | 12/1953 | Kuhns | 190/12 R |
| D176,895 | S |  | 2/1956 | Amigone |  |
| 2,805,788 | A |  | 9/1957 | Allbright |  |
| 2,840,384 | A | * | 6/1958 | Bard | 280/47.371 |
| 2,911,133 | A |  | 11/1959 | Ruggieri |  |
| 2,983,402 | A | * | 5/1961 | Gottsegen | 220/318 |
| 3,057,508 | A | * | 10/1962 | Kimbrough, Jr. | 220/318 |

(Continued)

FOREIGN PATENT DOCUMENTS

GB    2171064 A    *    8/1986

OTHER PUBLICATIONS

Office Action dated Apr. 7, 2009 in U.S. Appl. No. 29/324,757.

(Continued)

*Primary Examiner* — Jeffrey J Restifo
*Assistant Examiner* — Brodie Follman
(74) *Attorney, Agent, or Firm* — Lempia Summerfield Katz LLC

(57) ABSTRACT

An ice transport system includes a cart and a plurality of ice totes. The cart includes a bed and a plurality of retention structures mounted on the bed. The plurality of ice totes are arranged on a platform of the bed and contained on the platform by the plurality of retention structures. The plurality of retention structures are configured and positioned relative to the platform to contain the plurality of ice totes on the platform while leaving an access side of a plurality of sides of the platform open for loading and unloading the plurality of ice totes. In some cases, each ice tote may include a hang hook removably disposed within a recess in the exterior surface of the tote and configured to extend outward from the exterior surface.

22 Claims, 13 Drawing Sheets

U.S. PATENT DOCUMENTS

| | | | |
|---|---|---|---|
| 3,137,423 A | | 6/1964 | Tupper |
| 3,194,576 A | * | 7/1965 | Kunkle ......................... 280/654 |
| 3,273,747 A | * | 9/1966 | Kalz .............................. 220/318 |
| 3,472,392 A | * | 10/1969 | Hahn ........................ 211/126.14 |
| 3,495,845 A | * | 2/1970 | Jensen ........................... 280/79.2 |
| 3,667,647 A | * | 6/1972 | Van Daalen ................. 220/23.4 |
| 3,670,523 A | | 6/1972 | Fogt et al. |
| 3,734,526 A | * | 5/1973 | Propst et al. ............. 280/33.998 |
| 3,782,583 A | | 1/1974 | Abbey |
| D231,722 S | | 6/1974 | Mockler .......................... D34/5 |
| 3,837,667 A | * | 9/1974 | Sernovitz ................... 280/47.34 |
| 3,883,204 A | | 5/1975 | Prada et al. |
| 3,907,117 A | * | 9/1975 | Williams ................... 211/85.19 |
| 3,908,831 A | * | 9/1975 | Brendgord ................. 211/88.01 |
| 4,042,111 A | | 8/1977 | Smith |
| 4,047,633 A | | 9/1977 | Trombly |
| D248,361 S | | 7/1978 | Trombly |
| 4,269,039 A | | 5/1981 | Baker |
| D260,066 S | | 8/1981 | Dark |
| D272,795 S | | 2/1984 | Pozzi |
| 4,756,439 A | | 7/1988 | Perock |
| D299,578 S | | 1/1989 | Wilson |
| 4,796,909 A | * | 1/1989 | Kirkendall .................... 280/651 |
| 4,801,034 A | * | 1/1989 | Sandomeno ............... 220/23.83 |
| 4,821,903 A | * | 4/1989 | Hayes ........................ 280/47.26 |
| D303,307 S | | 9/1989 | Juergens |
| 4,930,653 A | * | 6/1990 | Machado ..................... 220/23.4 |
| 4,964,650 A | * | 10/1990 | Dickinson .................... 280/641 |
| 4,984,704 A | | 1/1991 | O'Malley |
| 4,997,109 A | | 3/1991 | Carper |
| 5,015,142 A | * | 5/1991 | Carson .......................... 414/408 |
| 5,048,857 A | * | 9/1991 | Stevens ......................... 280/651 |
| 5,090,587 A | * | 2/1992 | Brown .......................... 220/475 |
| 5,092,480 A | * | 3/1992 | Waterston ................... 220/23.4 |
| D327,756 S | | 7/1992 | Klein et al. |
| 5,135,245 A | * | 8/1992 | Pagone et al. ................ 280/79.2 |
| 5,149,125 A | * | 9/1992 | Gray ............................ 280/651 |
| 5,154,359 A | * | 10/1992 | Junta et al. ................... 280/79.2 |
| 5,184,836 A | | 2/1993 | Andrews et al. |
| 5,211,030 A | | 5/1993 | Jameson |
| 5,222,853 A | * | 6/1993 | Carson .......................... 414/408 |
| 5,263,701 A | * | 11/1993 | Kleinhen ...................... 271/145 |
| D353,241 S | | 12/1994 | Breen |
| 5,375,860 A | * | 12/1994 | Ernsberger et al. ........ 280/47.35 |
| 5,400,916 A | | 3/1995 | Weber |
| 5,454,625 A | | 10/1995 | Christensen et al. |
| 5,464,104 A | * | 11/1995 | McArthur .................. 211/133.3 |
| 5,558,359 A | * | 9/1996 | Phears ........................... 280/654 |
| 5,662,235 A | * | 9/1997 | Nieto .......................... 220/23.86 |
| D386,861 S | | 11/1997 | Sutton |
| 5,758,888 A | * | 6/1998 | Burgan et al. .............. 280/47.34 |
| 5,876,047 A | * | 3/1999 | Dennis ....................... 280/47.35 |
| 5,887,758 A | * | 3/1999 | Hawkes et al. ............. 222/146.6 |
| 6,003,703 A | | 12/1999 | Ruggeri et al. |
| 6,419,244 B2 | * | 7/2002 | Meabon ..................... 280/47.27 |
| 6,471,237 B1 | * | 10/2002 | Bedsole ........................ 280/655 |
| 6,533,298 B2 | * | 3/2003 | Sims .......................... 280/47.26 |
| 6,536,590 B1 | | 3/2003 | Godshaw et al. |
| D476,532 S | | 7/2003 | Edwards |
| D477,447 S | | 7/2003 | Calaicone |
| 6,648,349 B1 | * | 11/2003 | Waller et al. .............. 280/47.35 |
| 6,659,495 B1 | * | 12/2003 | Sanderson .................... 280/651 |
| 6,676,141 B1 | * | 1/2004 | Hadley ....................... 280/47.35 |
| 6,695,325 B2 | * | 2/2004 | Carrillo ...................... 280/47.34 |
| 6,779,805 B1 | * | 8/2004 | Marcus ....................... 280/79.11 |
| 6,851,563 B1 | * | 2/2005 | Lipari ............................ 211/74 |
| 6,877,764 B2 | * | 4/2005 | Sagol ......................... 280/655.1 |
| 6,966,574 B1 | * | 11/2005 | Dahl ............................ 280/651 |
| 7,014,197 B2 | * | 3/2006 | Baldwin et al. ............ 280/47.27 |
| 7,044,483 B2 | | 5/2006 | Robertson et al. |
| 7,066,477 B2 | * | 6/2006 | Dubois et al. .............. 280/79.11 |
| D533,700 S | | 12/2006 | Lo |
| D544,310 S | | 6/2007 | Smigiel |
| 7,384,051 B1 | * | 6/2008 | Haire ......................... 280/47.34 |
| 7,416,196 B2 | * | 8/2008 | Brown ........................ 280/79.11 |
| 7,661,685 B2 | * | 2/2010 | Thibault .................... 280/47.35 |
| 2003/0020261 A1 | | 1/2003 | Perelli et al. |
| 2003/0209884 A1 | * | 11/2003 | Joie et al. ...................... 280/651 |
| 2005/0057011 A1 | * | 3/2005 | Chang ........................ 280/47.35 |
| 2006/0017247 A1 | * | 1/2006 | Farley ........................... 280/79.3 |
| 2006/0255213 A1 | * | 11/2006 | Lawson et al. .................. 248/95 |
| 2007/0068942 A1 | * | 3/2007 | Smudde ..................... 220/23.86 |
| 2007/0096437 A1 | * | 5/2007 | Watson ......................... 280/651 |
| 2008/0284119 A1 | * | 11/2008 | Williamson ..................... 280/30 |
| 2008/0303231 A1 | * | 12/2008 | Gu ............................. 280/47.17 |
| 2009/0152026 A1 | * | 6/2009 | Hawkinson et al. ......... 180/65.1 |
| 2009/0166999 A1 | * | 7/2009 | Mason et al. ................. 280/651 |
| 2009/0230644 A1 | * | 9/2009 | Stanley .......................... 280/43 |
| 2010/0102524 A1 | * | 4/2010 | Larsen et al. .................. 280/35 |
| 2010/0243012 A1 | * | 9/2010 | Lindeman et al. ......... 135/88.02 |

OTHER PUBLICATIONS

Product Data Sheet, Carlisle Icemaster Ice Transport Tote, Carlisle Foodservice Products, www.catalog.carlislefsp.com, 3 pages (2006).
Product Data Sheet, Follett Ice Storage and Transport Systems, Follet Corporation www.follettice.com, 1 page (2000-2008).
Product Data Sheet, Follett Ice storage and transport systems with SMARTGATE, Follet Corporation, 2 pages (Jun. 2007).
Product Data Sheet, Follett single bay ice storage and transport systems with SMARTGATE, Follet Corporation, 2 pages (2006).
Product Data Sheet, Flexi-Tops™ for Follett Single Door Upright Bins & Ice Device, Follet Corporation, 4 pages (Jun. 2007).
Product Data Sheet, San Jamar Saf-T-Ice Tote, San Jamar/The Colman Group Inc., www.sanjamar.com, 1 page (May 2009).
Product Data Sheet, Traex Safety Mate Ice Porter, Libbey Foodservice 2008/09 Catalog, (Aug. 2008).

* cited by examiner

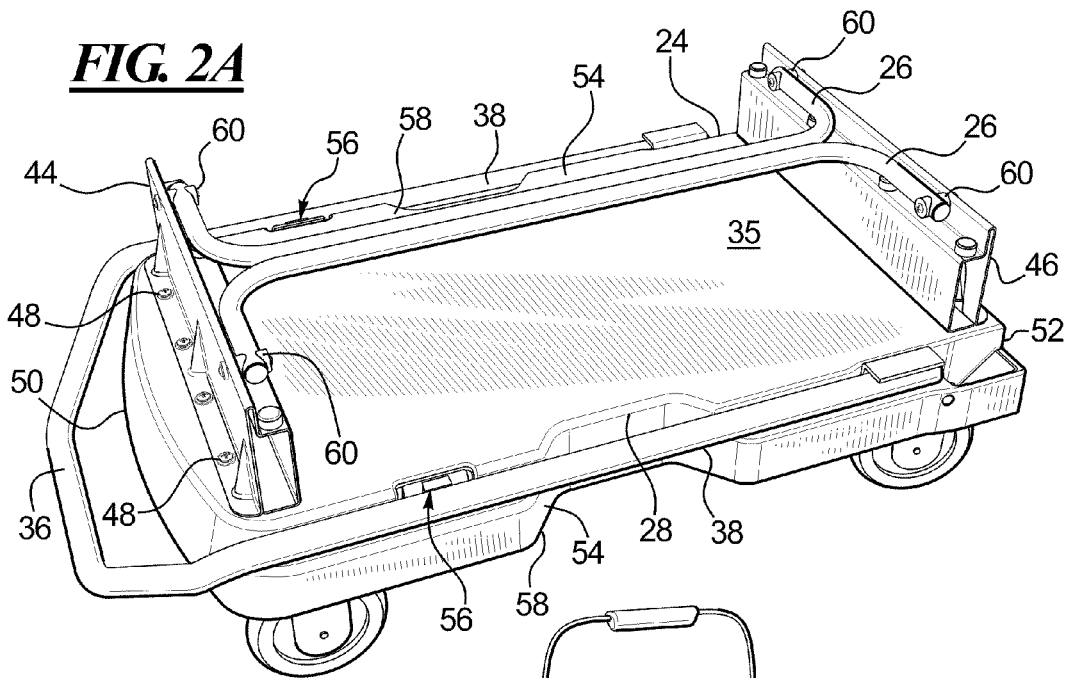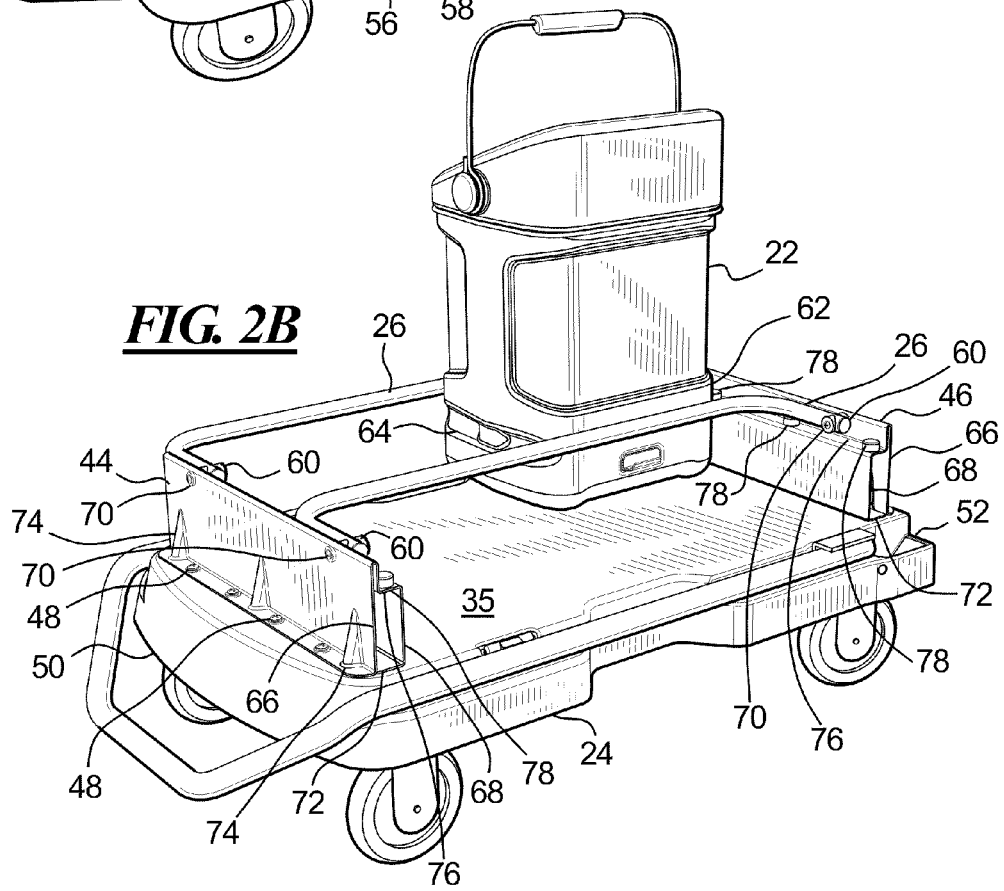

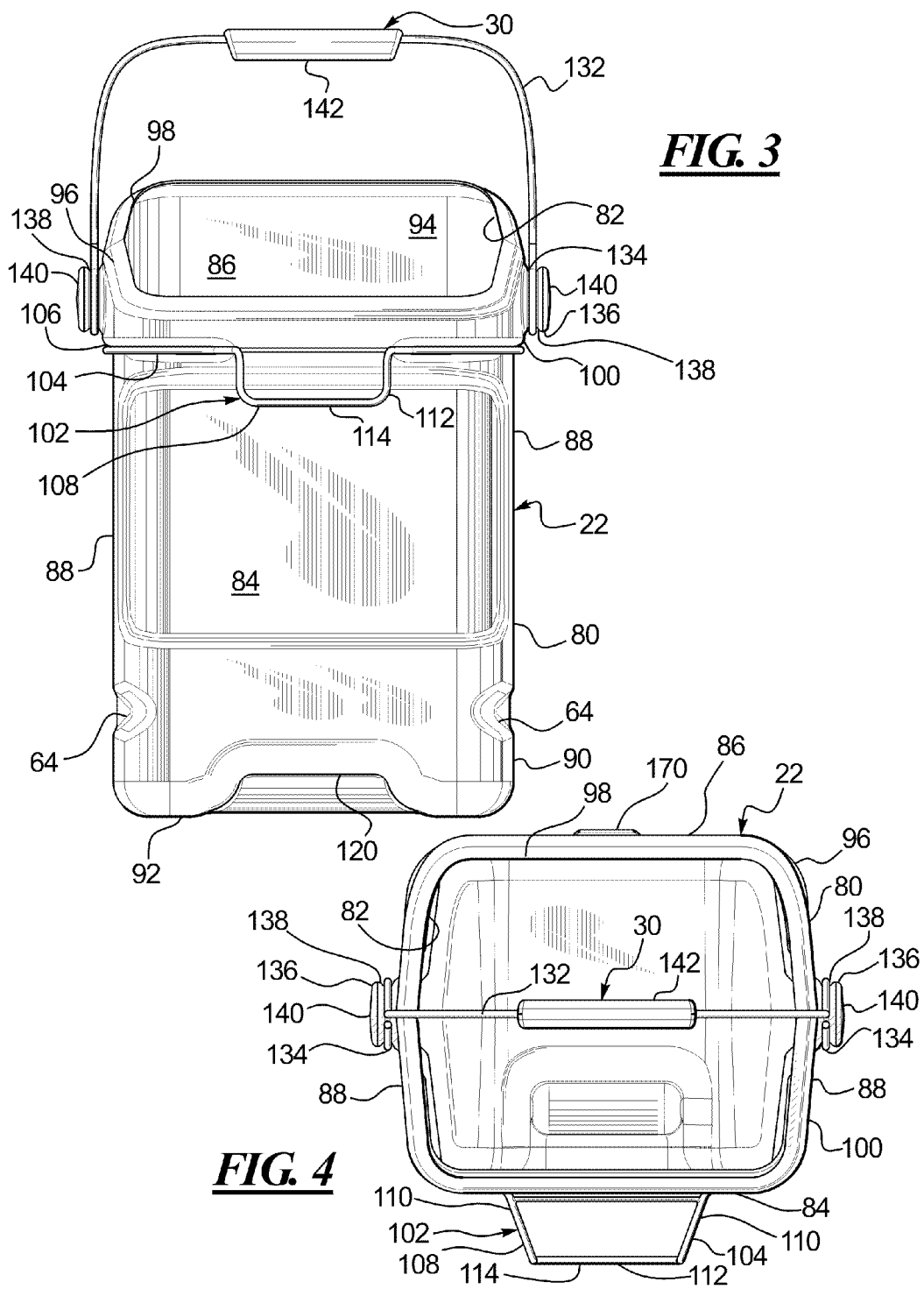

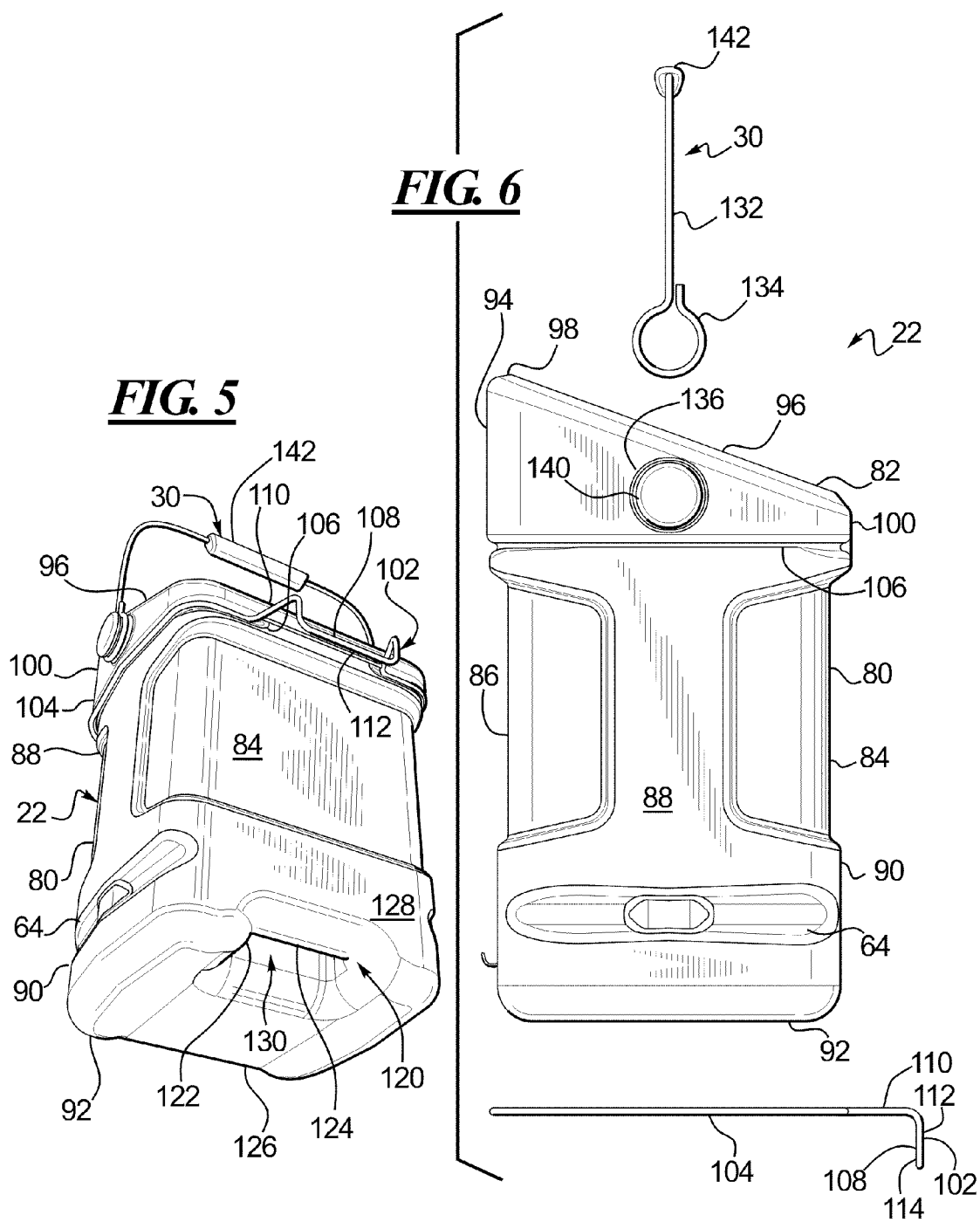

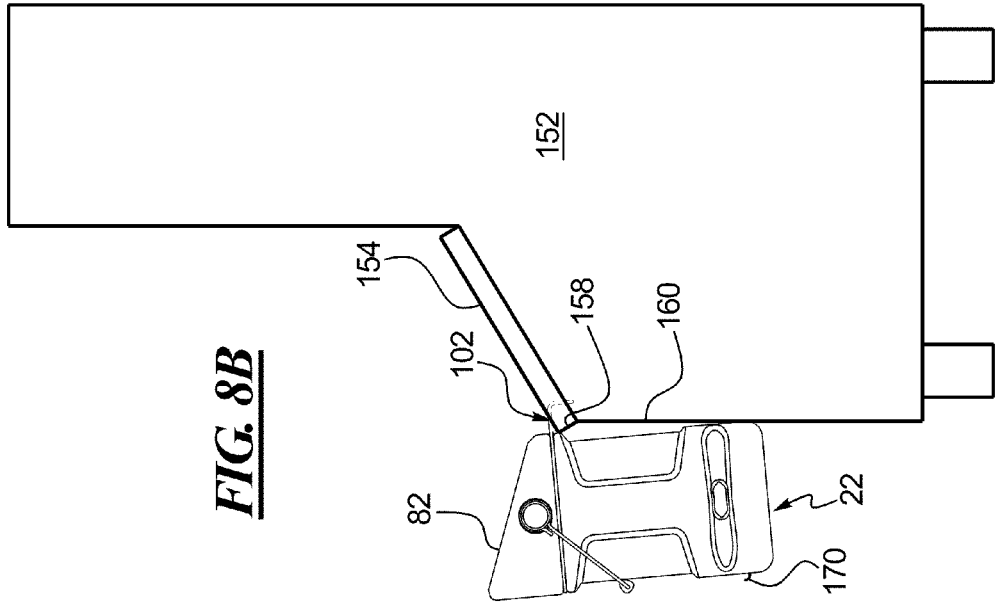
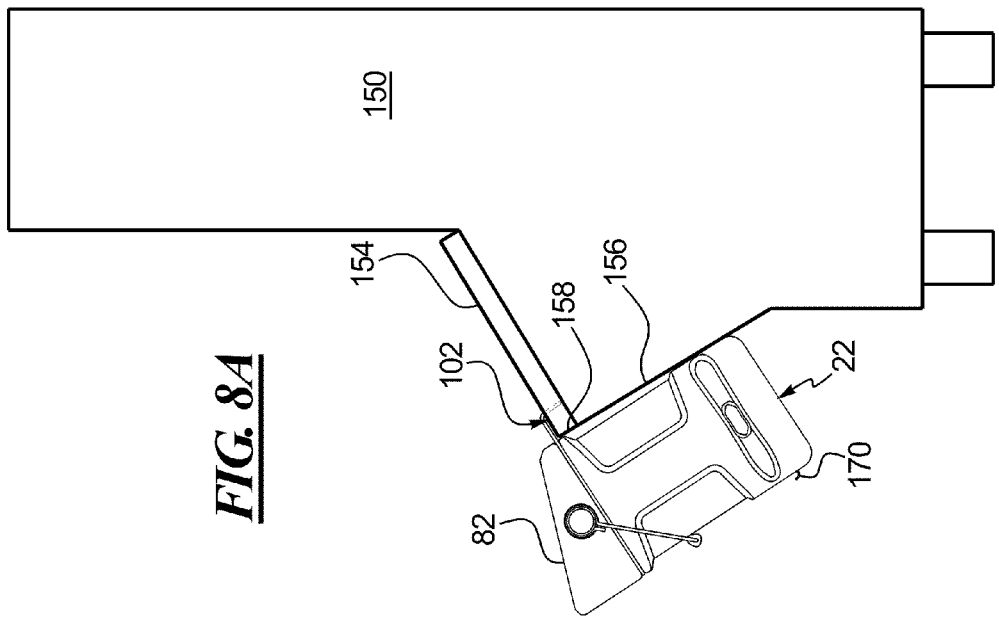

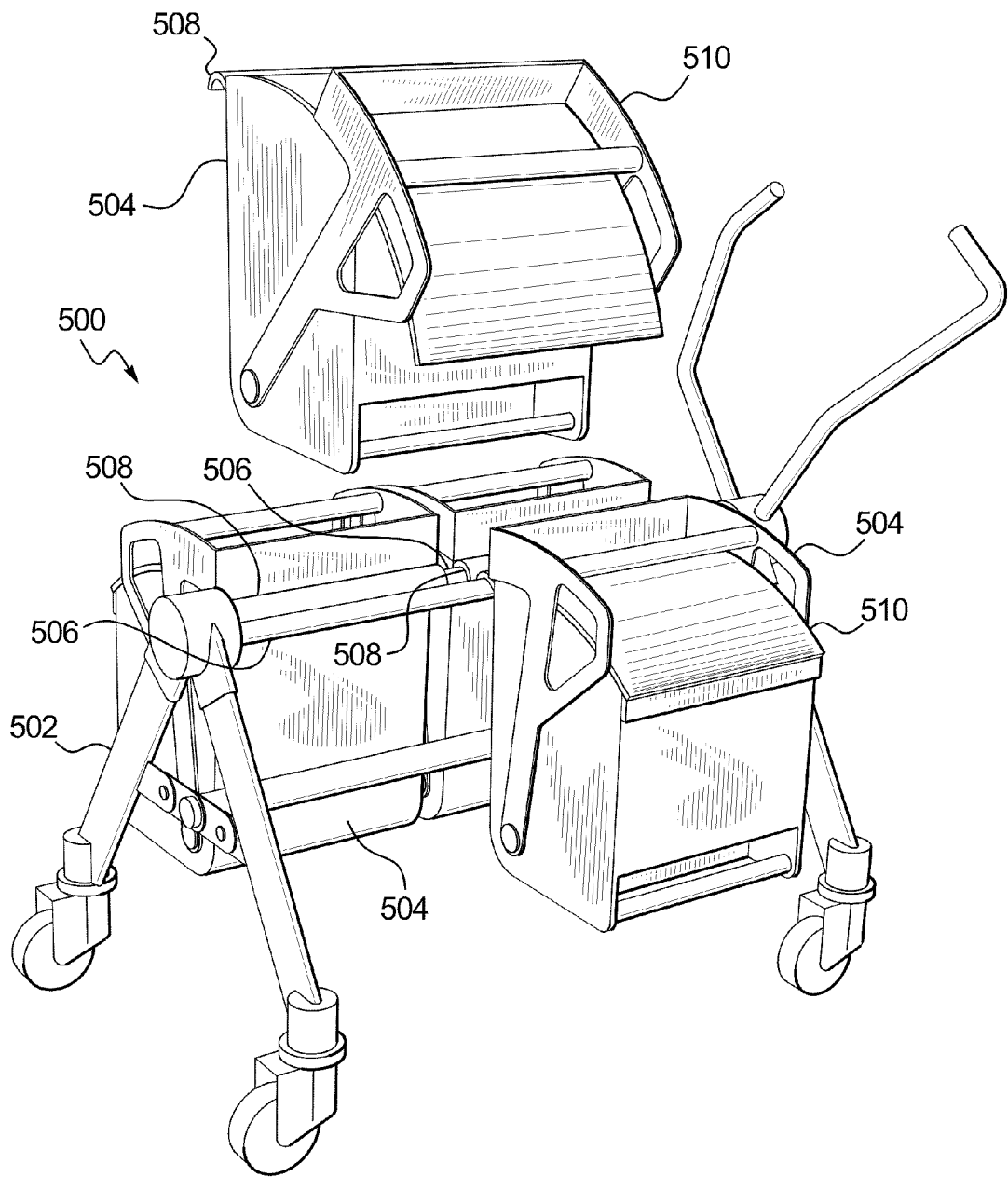

ICE TRANSPORT SYSTEM

CROSS-REFERENCE TO RELATED APPLICATION

This application claims the benefit of U.S. provisional application entitled "Ice Transport System," filed Feb. 19, 2008, and having Ser. No. 61/029,908, the entire disclosure of which is hereby expressly incorporated by reference.

BACKGROUND OF THE DISCLOSURE

1. Field of the Disclosure

The present disclosure is generally directed to transporting ice within commercial kitchen and similar environments, and more particularly to ice totes, transport carts, and systems used to contain and transport ice.

2. Description of Related Art

A number of safety issues are raised in connection with the movement of ice within a commercial food establishment. These issues include (i) the cross-contamination of ice during movement, (ii) improper ice containment leading to ice falling to the ground, which, in turn, can cause slip and fall accidents, and (iii) back strain related to loading, carrying and dispensing ice. The movement of ice has also created challenges in connection with the storage of ice management products because of limited space in most commercial kitchens.

The movement and handling of ice has typically not been addressed as a system. Instead, commercially available products have focused on small sub-segments of the entire ice movement process. Two companies providing products in this area are San Jamar and Follett Ice. Follett is an ice machine manufacturer that has developed a gravity-fed machine, which allows ice to be dispensed from the machine through a chute. Follett has also developed a cart that carries three removable bins. The cart fits under the ice chute and ice can be dispensed out of the machine, directly into the cart bins via the ice chute. The cart can then be wheeled to locations remote from the ice machine, whereupon each bin can be accessed independently to dump ice into a beverage station or other ice holding area.

In the past, operators of commercial kitchens have traditionally used pickle buckets or other non-dedicated containers to move ice. More recently, many operators have switched to using containers dedicated to ice. These ice totes have been designed to have the ability to hang upside down for air drying, as well as to drain and prevent nesting. San Jamar, Carlisle, and Traex have made ice buckets or totes available. The "SAFE T ICE" branded tote from San Jamar is a translucent bucket with a removable handle for NSF clean-ability standards and a hook on the bottom side to hang the bucket upside down for drainage and drying. The San Jamar buckets are round, non-nesting cylinders, which can present a disadvantage as far as space saving storage and transport. By not allowing the buckets to be nested, however, the buckets help to avoid cross contamination, which is an advantage. The San Jamar buckets are relatively large and hold six gallons, or 25-30 pounds, of ice, and a flexible lid is available to cover the top openings.

Notwithstanding the wide variety of available products, food safety remains a predominant issue in commercial kitchens. While ice is food, it has not been typically treated with the same care as other food, and in spite of the availability of ice transport products. It remains common to see employees handle the ice with their hands, otherwise unintentionally contaminate ice, or show disregard for the quality and cleanliness of the ice. Thus, there remains room for improvement in reducing or eliminating improper ice handling.

BRIEF DESCRIPTION OF THE DRAWINGS

Objects, features, and advantages of the present invention will become apparent upon reading the following description in conjunction with the drawing figures, in which like reference numerals identify like elements in the figures, and in which:

FIGS. 2A and 2B are perspective views of an exemplary cart of the ice transport system of FIG. 1 constructed in accordance with one or more aspects of the disclosure and arranged in a storage configuration and an alternative in-use configuration, respectively;

FIG. 3 is a front, elevational view of an exemplary ice tote or bucket of the ice transport system of FIG. 1 constructed in accordance with one or more aspects of the disclosure;

FIG. 4 is a top or plan view of the ice tote of FIG. 3;

FIG. 5 is a bottom perspective view of the ice tote of FIG. 3;

FIG. 6 is a side, elevational, and exploded view of the ice tote of FIG. 3;

FIGS. 8A and 8B are schematic representations of the ice tote of FIG. 3 to depict the use of the hang hook in a loading configuration with two different ice machines having front access loading bins;

FIG. 15 is a perspective view of an ice transport system with an ice tote constructed in accordance with an alternative embodiment and a foldable cart configured to carry more than one of the alternative ice totes.

DETAILED DESCRIPTION OF THE DISCLOSURE

The disclosure is generally directed to ice transport systems having a cart for carrying multiple ice buckets or totes. In multiple ways, the disclosed ice transport systems and components thereof address a number of the challenges arising during the handling and transport of ice in a commercial kitchen or other context. For instance, movement of the ice from an ice machine to a beverage dispenser or other location is facilitated by a number of features of the totes, including aspects directed to a cooperative engagement of the totes with the ice machine, as well as a secure and cooperative engagement of the totes with the cart. Together, the cart and totes support the bulk transport of ice while minimizing the potential for contamination, spillage, and employee injury, at various points in the handling process (i.e., before, during, and after transport of the ice). Still other features of the disclosed systems, carts, and totes provide advantages for cleaning and maintaining the system components. By simplifying and facilitating multiple stages of the process, the disclosed systems also help to ensure that employees follow the various government regulations or guidelines related to the handling and transport of ice.

Some aspects of the disclosure are directed to structural features of the totes, including a hang hook removably disposed along one of the side faces of a bucket or container of the tote and configured to extend outward from the bucket to engage an ice machine. The hang hook may be secured within a recess formed in one or more of the side faces. In some cases, the hang hook includes a wire form loop captured in a groove formed in one or more side faces of the bucket. Another aspect of the tote involves a recessed lower grip formed in a bottom face of the bucket. The recessed nature of the grip allows a user to grasp the bucket at both upper and lower locations for convenient lifting, pouring, etc., without touching a surface that contacts the floor. Pouring ice out of the tote is also made more convenient by an angled opening or spout in the form of an extended rear side face, which may also help prevent spillage during transport or loading.

Some aspects of the disclosed ice transport systems are directed to the manner in which the disclosed ice transport carts are easily loaded or unloaded with the totes. For instance, the carts may be configured with a flatbed or platform having one or more open or wall-free sides, while still managing to retain or contain the totes upon the platform. To that end, a variety of different adapter or retention structures may be mounted on the platform to provide containment with little or no obstruction or barrier to loading and unloading totes. The adjustability of the cart through the adapter structures may also be useful for reconfiguration to a storage orientation or alternate in-use configurations directed to securely transporting a varying number of totes.

Figure 1:
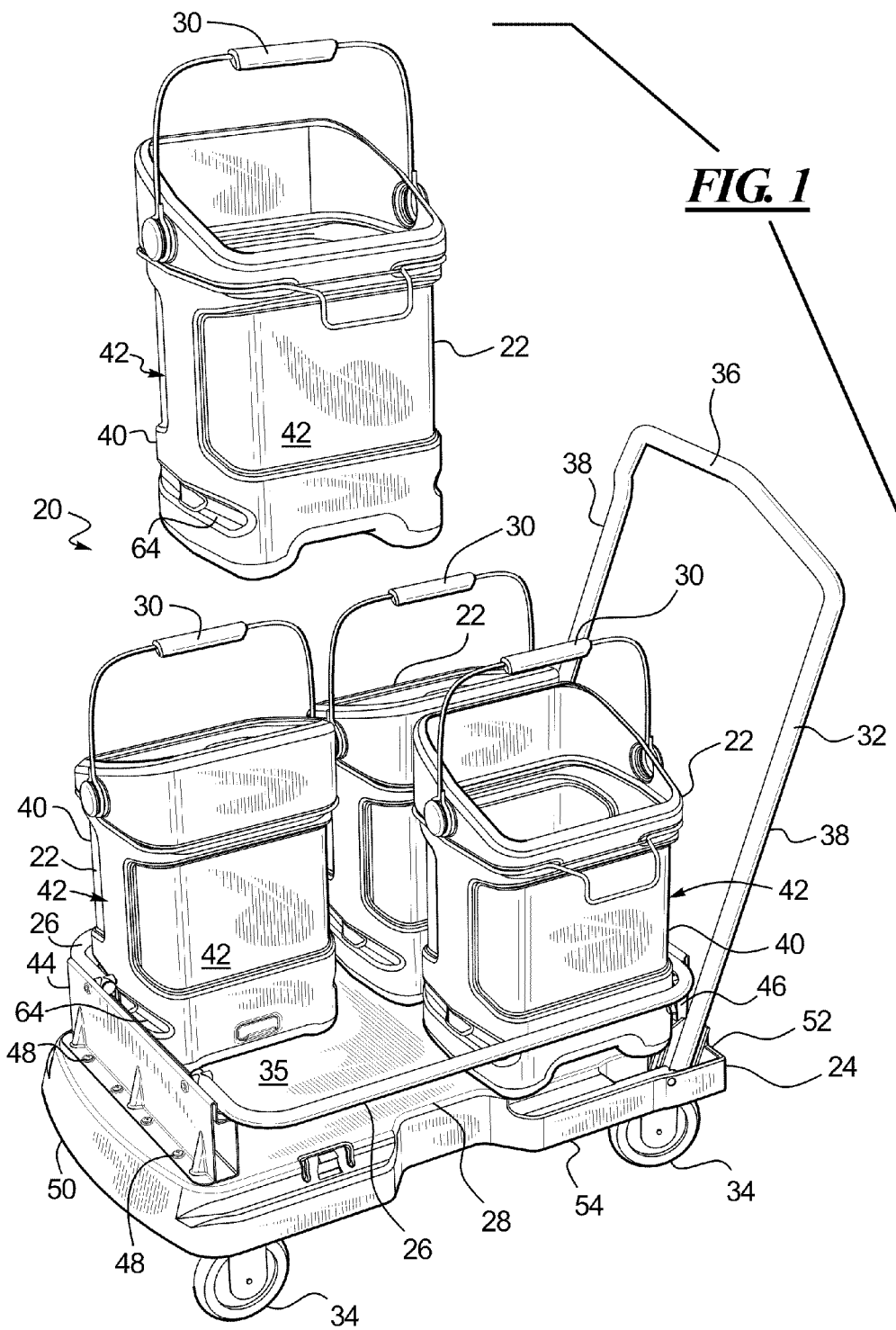
FIG. 1 is a perspective view of an exemplary ice transport system constructed in accordance with several aspects of the disclosure.

With reference now to the drawing figures, FIG. 1 depicts one example of an ice transport system 20 having a plurality of totes or buckets 22 and a cart 24. The totes 22 and the cart 24 are generally configured to facilitate the bulk transport of ice by allowing multiple totes 22 to be loaded onto the cart 24. To that end, the cart 24 includes a pair of adjustable, U-shaped retention rails 26 that help to secure the totes on a flat bed 28 of the cart 24. The totes 22, in turn, are generally configured and constructed to allow a number of totes to be packed or loaded onto the bed 28 within the retention rails 26 in a secure manner. In this example, the totes 22 and the cart 24 are configured such that four totes may be loaded onto the bed 28 in a secure, quad-packed arrangement. To facilitate the loading of the cart 24, each tote 22 includes a carrying handle 30 designed for lifting and placing the tote 22 onto the bed 28. Generally speaking, the retention rails 26 and other containment structures are mounted on the bed 28 and configured to retain the totes 22 in the interest of avoiding spills, while not undesirably obstructing the loading of the totes 22 onto the bed 28. Further details regarding these and other aspects of the retention structures of the cart 24 are provided below.

Once the totes 22 are loaded onto the bed 28, a push handle 32 of the cart 24 may be used to maneuver the cart 24 to a desired location. To that end, the cart 24 includes a number of wheels or casters 34 supporting the cart 24 on a floor or other ground surface. One or more of the wheels 34 may swivel to a desired extent to improve maneuverability. For example, the wheels 34 may include 4 in. or larger casters to help overcome standard commercial kitchen obstacles. The rear two casters may be fixed, facing forward, while the front two casters can be free to rotate 360 degrees, similar to a shopping cart. This configuration allows for both tracking and maneuverability. The characteristics of the wheels 34, the push handle 32, and other components of the cart 24 not related to the retention of the totes 22 may vary considerably from the example shown.

The bed 28 of the cart 24 generally disposes a load platform 35 at a height level that allows the cart 24, with one or more totes 22 loaded thereon, to fit under conventional gravity-fed ice machines. With the machines referenced above, this design consideration may, for instance, lead to keeping the loaded height to equal to or less than 21.5 inches, as well as an overall length of at least 35 inches. On the other hand, the bed 28 and the platform 35 are disposed at a height that sufficiently spaces the totes 22 from the floor. Keeping the totes 22 away from or off the floor helps keep the totes 22 free of contaminants in accordance or compliance with FDA or other government regulations or guidelines. In this case, the height level of the platform 35 is low enough such that the tops of the totes 22 remain below or significantly below a central, handle grip 36 of the push handle 32, which is positioned at a height convenient for an operator maneuvering the cart 24. The height of the push handle 32 is, in turn, determined by the extent to which a pair of arms 38 extend downward and forward from the handle grip 36 to reach the bed 28 at a level near the wheels 34. These and other characteristics of the cart 24 help the disclosed ice transport systems to be compatible and well suited for use with a variety of ice machines and ice transport contexts.

The size, shape and other characteristics of the cart 24 are generally directed to providing a carrier structure dedicated to transporting multiple ice totes or buckets. In this example, the bed 28 and the platform 35 have a generally rectangular shape when viewed from above. The surface area of the platform 35 is largely devoted to providing a loading area or surface for the totes 22. That is, the multiple totes 22 substantially cover the platform 35 when positioned in the tightly packed arrangement shown in FIG. 1, leaving little excess or unused space or surface area. In some cases, the retention rails 26 may allow the totes 22 to overhang the lateral sides 54 to an extent. As a result, the cart 24 may be slightly narrower than the width of the adjacently packed totes 22, which may be useful in connection with cart maneuverability, storage, or other use or non-use contexts. Notwithstanding the foregoing, the shape and size of the bed 28 may vary from the example shown as desired, including when, for instance, the dimensions or shapes of the totes 22 vary from the example shown.

To create a secure, tightly packed arrangement on the platform 35, each tote 22 has a bucket-shaped body 40. The body 40 has a set of generally or substantially upright, flat side walls 42 that define a generally rectangular cylindrical exterior shape. While the body 40 need not have the square cross-section in the example shown, the symmetry of the exterior shape may lead to more efficient and stable loading arrangements on the cart 24. More generally, the substantially upright, flat nature of the side walls 42, together with the rectilinear nature of the body 40, allows the totes 22 to be tightly packed on the platform 35. In this case, the totes 22 are arranged in a two-by-two configuration with each tote 22 having two of the sides 42 facing corresponding sides 42 of an adjacent tote 22. More specifically, this example involves either rear sides 42 of the adjacent totes 22 facing one another or lateral sides 42 of the adjacent totes 22 facing one another. While the packing or loading arrangement may vary from the example shown, the depicted arrangement may advantageously secure the totes 22 in position on the platform 35, as described in greater detail below. Also provided below are further details regarding the configuration and construction of each tote 22, including details that allow for useful and convenient interaction with the cart 24.

In accordance with one aspect of the disclosure, the cart 24 is generally adaptable or adjustably configured to accommodate a number of totes or buckets. In the example shown in FIG. 1, the retention rails 26 provide the adaptability and adjustability. More specifically, each U-shaped rail 26 is pivotably mounted to the bed 28 between a forward or front wall 44 and a rearward or back wall 46. To that end, each rail 26 includes a portion oriented in parallel with and adjacent to the wall 44, a central longitudinal portion running transverse to the walls 44, 46, and a portion oriented in parallel with adjacent to the wall 46. Thus, in this case, the ends of the parallel portions of each rail 26 are pivotably coupled to the bed 28 at one of the walls 44, 46. The walls 44, 46, in turn, are mounted to the bed 28 via bolts 48 or other fasteners to extend upward from the platform 35 at and along front and rear ends or sides 50, 52 of the cart 24, respectively. In this example, each wall 44, 46 is oriented laterally and configured to extend roughly the entire width of the platform 35. In other cases, the walls 44, 46 need not extend as far toward lateral sides 54 of the cart 24 as shown. In general, however, the walls 44, 46 are configured with a length, and mounted in a position, to help prevent the totes 22 from falling forward or rearward, respectively. In contrast, the lateral sides 54 of the cart 24 are free of any walls rising upward from the platform 35 and instead present a comparably open perimeter section.

Turning now to FIGS. 2A and 2B, further details regarding the construction and other characteristics of the structures used to contain the totes 22 on the cart 24 are provided in connection with two alternate configurations of the cart 24. FIG. 2A depicts the cart 24 in a folded or collapsed configuration, while FIG. 2B depicts the cart 24 in an alternate in-use configuration. The folded configuration orients the cart 24 conveniently for storage or other periods of non-use via the reorientation and relocation of the push handle 36. In this example, the push handle 36 pivots about a joint (not shown) from the in-use orientation and position shown in FIG. 1 to a horizontal, storage position in line and compact arrangement with the bed 28. The cart 24 may include a number of latches, detents, or other mechanisms 56 located on the lateral sides 54 to capture the arms 38 along the bed 28. In this way, the handle 36 can remain in the storage position even if the cart 24 is stored on a side or other non-upright orientation. The nature and characteristics of the latches 56 may vary considerably as desired. The flat bed 28 and the platform 35 may include a notch or cutout 58 along each one of the lateral sides 54 to allow a user to grasp the arms 38 to facilitate switching between the in-use and folded orientations.

The re-configuration of the cart 24 into the storage orientation also includes the movement or adjustment of the retention rails 26. In this example, each retention rail 26 is rotated inward from the outward positions shown in FIG. 1. To this end, each retention rail 26 is attached to the walls 44, 46 at a pair of pivot joints 60. Rotation about the pivot joints 60 allows the retention rails 26 to reach the inward positions shown in FIG. 2. The inward position of the retention rails 26 may also be useful for avoiding the obstruction of the re-orientation of the push handle 36 to or from the storage position shown in FIG. 2A.

The alternate in-use orientation of the cart 24 shown in FIG. 2B provides another example of the adaptability of the cart 24. Generally speaking, the cart 24 can adapt to accommodate to transport a varying number of totes 22 in a secure manner. To this end, one of the retention rails 26 is rotated to the outward position, while the other retention rail 26 is rotated to the inward position. A secure space for one or two of the totes 22 is provided on the platform 35 as a result of the positioning of the inward rail. The size of the totes 22, the position of the pivot joints 60, and the size, length, and configuration of the retention rails 26 also lead to this result. For instance, the arrangement of the totes 22 on the platform 35 may involve the coordination of the positioning the pivot joints 60 with the midpoint of the side walls 42 of the totes 22 to create a tight or snug fit between the inward rail and the tote 22. One or both of the forward and rearward walls 44, 46 may also provide containment.

The shape and configuration of the retention rails 26 generally provides part of an encircling containment structure mounted on the platform 35. In this case, the containment structure includes the forward and rearward walls 44, 46. In other cases, containment need not form a complete perimeter of the tote arrangement, but rather only one or more segments thereof. For example, the walls 44, 46 need not extend the entire width of the cart 24, or each wall 44, 46 may be separated into distinct structures dedicated to supporting respective retention rails 26. Furthermore, any number of the segments or portions of the containment structure may be adjustable or adaptable. As shown in the alternative examples described below, the containment structure need not include both stationary or fixed structures, such as the front and rear walls, in addition to the adaptable or adjustable structures.

One aspect of the containment structures and, more generally, of the disclosed ice transport systems, involves the ease with which the cart 24 may be loaded and unloaded. The accessibility of the platform 35 to loading and unloading the totes 22 may be advantageous in view of the potential for users to have difficulty lifting the ice-filled totes. In this example, the open nature of the lateral sides 54, as well as the relatively low level at which the rails 26 are spaced from the platform 35 help to avoid uncomfortable or injury-prone loading situations. The short height of the walls 44, 46 may also help in the event that the totes 22 are loaded or unloaded at the front or back ends 50, 52. More generally, in each of the examples described herein, the containment structures mounted on the platform 35, whether fixed or adjustable, provide only a footer or base barrier to loading and unloading, or, in some cases, no barrier at all along the sides of the cart 24. In the examples in which the barrier is positioned along the sides of the cart 24, the height or level at which the barrier is spaced from the platform 35 is below or significantly below the midpoint of the tote height, or the center of gravity of a tote filled with ice. In this example, the retention structures may be spaced or extend from the platform only to an extent that remains within a base portion 62 of each tote 22, as best shown in FIG. 2B. In the examples described below, a side of the cart may present no barrier at all due to a pressure fit with a retention structure mounted within the interior of the platform 35.

In these ways, the disclosed carts provide sufficient containment for secure transport while avoiding an overly obstructionist retention structure. Too much obstruction through, for instance, higher walls, makes unloading and loading of the cart 24 more difficult, and more prone to causing back strain. One of the unexpected results of the configuration of the disclosed carts is that the totes are adequately contained within the rails, footer walls, or other low barriers, and thereby retained upon the platform 35 despite the relative size and higher center of gravity of the ice-filled totes 22.

Other aspects of the disclosed totes and the retention structures of the cart may further promote safe handling and transport. As shown in FIGS. 1 and 2B, each tote 22 has a horizontal indentation or detent 64 shaped and positioned to cooperate with the retention rails 26. Each retention rail 26, in turn, may be formed from a tube (or be tube-shaped) sized to be received or otherwise cooperate with the indentation 64. To that end, the tube may have a diameter corresponding with the size of the indentation 64. The indentation 64 may be formed in the exterior of each side wall 42 of the bucket 42, running substantially the entire width thereof. In this case, the indentations 64 are formed only in the lateral side walls 42, such that the totes 22 are preferentially oriented with the front side walls 42 facing laterally outward. In any case, the lateral side walls 42 of each tote 22 may then engage the retention rail 26 as it runs outward from the pivot joints 60 before turning to run parallel along the lateral side 54 of the cart 24. In some cases, the engagement may include a pressure fit to further secure the totes in position on the platform 35.

As best shown in FIG. 2B, the walls 44, 46 may include an outer support structure 66 and an inner support structure 68, both of which are mounted or oriented on the platform in a generally upright manner. The outer and inner support structures 66, 68 may be integrally formed from, for example, sheet metal bent into the shape shown, or from a molded component. In this example, the pivot joints 60 are supported by both the outer and inner support structures 66, 68 through a bolt or pivot pin 70 that passes through both structures. One or both of the outer and inner support structures 66, 68 are connected to a base or floor 72 that rests upon the platform 35. The outer support structure 66 includes a panel that extends vertically upward from the base and a flange for fastening or mounting one or both of the outer and inner support structures 66, 68 to the platform via the bolts or other fasteners 48. The outer structure 66 may also include a set of support posts or braces 74 to fortify the longitudinal position of the wall 44, 46. As with the other components of the walls 44, 46, each support post or brace 74 may be integrally formed with the panel of the outer support structure 66. The inner structure 68 includes a vertical panel that extends vertically upward from the base 72 to reach a step or shelf 76. The shelf 76 has stops 78 on either side of the pivot joints 60 to position the rails 26 at a desired height, level, orientation. Above the shelf 76, the inner support structure 68 includes another vertical panel that rises upward to meet the panel of the outer support structure 66.

With reference now to FIGS. 3-6, further details regarding the features and aspects of the exemplary tote 22 are provided. The tote 22 includes a bucket or container structure 80 that defines an upper or top opening 82 for filling the tote 22 with ice. The bucket structure 80 includes front and rear sides 84, 86 and opposing lateral sides 88, each of which is arranged in a generally upright manner. Each of the sides 84, 86, 88 includes one or more generally vertical surfaces that extend upward from a base or foundation 90 of the bucket structure 80 that includes a bottom side 92. The vertical surfaces of the sides 84, 86, 88 may include a variety of reinforced sections (e.g., ribs or other punched-out panels) for structural rigidity or panels of a recessed nature to define a desired container volume. In this case, the sides 84, 86, 88 of the bucket structure 80 are configured and arranged to form a cylindrical container with a square cross-section, although the cross-sectional shape of the totes 22 may vary considerably from the example shown. Nonetheless, the square or rectangular nature of the container shape may be useful in connection with efficient packing on the cart 24 (FIG. 1), and in connection with dispensing ice from the tote 22. That is, the angled corners formed at the junctions of the sides 84, 86, 88 may help to control the flow of ice and avoid spillage. As shown in the drawing figures, the angled corners may be rounded slightly to include a small curve, which may facilitate manufacturing as well as the capture of a wire form structure described below in connection with a hang hook feature of the disclosed totes.

The rear side 86 includes a raised or elevated back wall or face 94 that creates an angled top for the opening 82. This aspect of the totes 22 may be useful as a spout when dispensing ice from the tote 22, as well as a spill shield or backboard to direct or keep ice in the bucket structure 80 during filling and transport. To these ends, the lateral sides 88 have an inclined top edge to form a rim 96 that slopes upward from the front side 84 to reach the elevated back face 94. The rim 96 also has an edge 98 that rolls or bends slightly inward to prevent nesting of the totes 22. The shape of the rims 96 may also help to prevent spillage.

The elevated back face 94 forms part of a crown or head portion 100 of the bucket structure 80 configured to accommodate a hang hook 102 so that the tote 22 can hang on the edge of an ice machine for filling the tote with ice. Examples are shown and described in connection with FIGS. 5A and 8B. Generally speaking, the ability to hang the tote 22 on the ice machine helps commercial kitchens comply with FDA regulations and other guidelines prohibiting or discouraging contact with the floor. In this way, the disclosed totes eliminate the need for rudimentary solutions involving milk crates or other structures onto which ice buckets would rest during filling. Having the totes 22 conveniently located and engaged with the ice machine may also reduce back strain, insofar as the user need not bend over to fill the tote.

Figure 7:
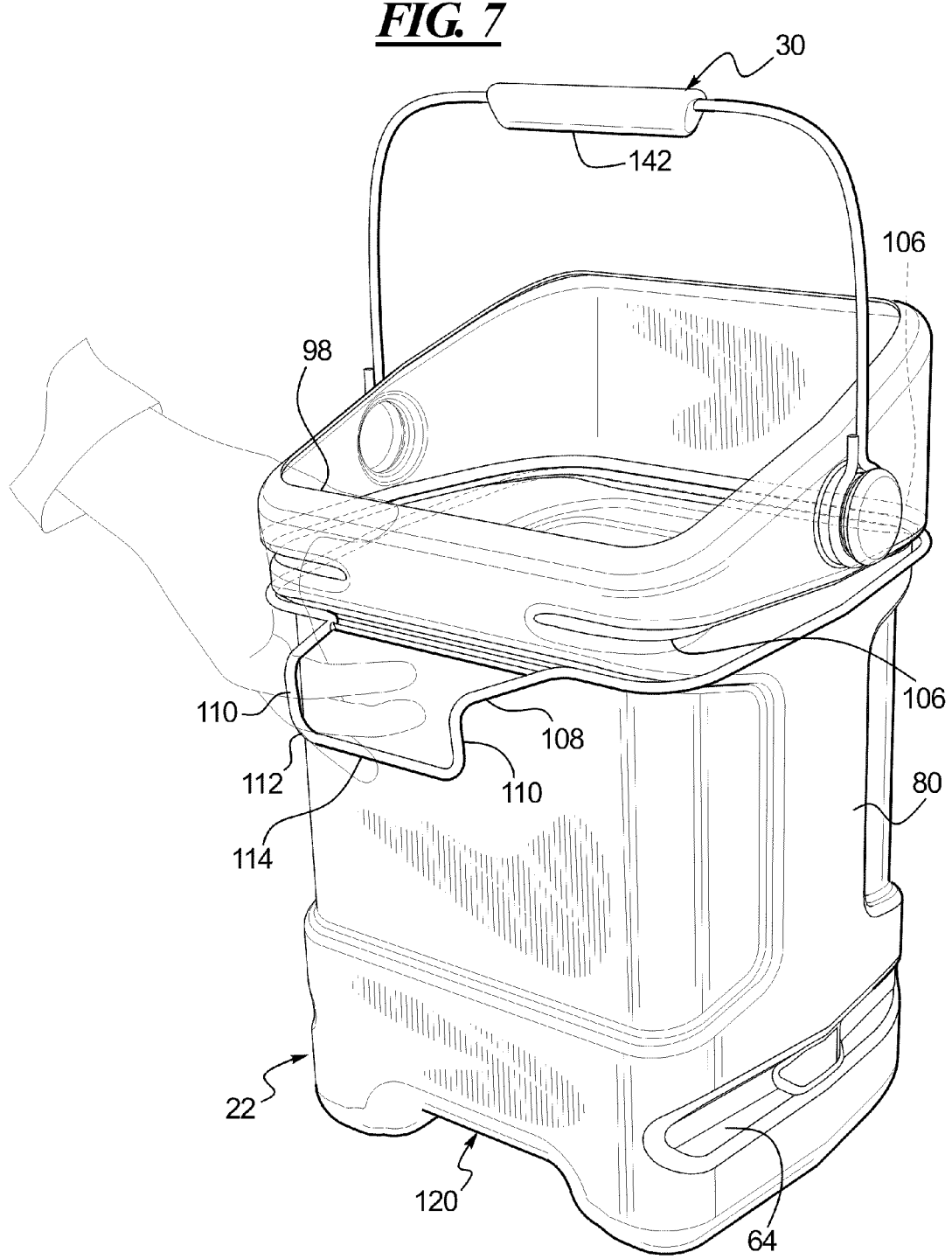
FIG. 7 is a perspective view of the ice tote of FIG. 3 to depict the installation and positioning of a hang hook in accordance with one or more aspects of the disclosure.

In the embodiment shown in FIGS. 3-6, the hang hook 102 includes a wire form loop 104 captured in one or more recesses or grooves 106 formed in the bucket structure 80 and best shown in FIGS. 6 and 7. In this example, the groove 106 is located near the top of the tote 22, e.g., where the sides 84, 86, 88 meet the head 100 of the bucket structure 80, although the position may vary as desired. While any number of grooves or recesses may be used to capture the loop 104, this example relies on a single groove that runs in a horizontal plane across the widths of the rear side 86 and the lateral sides 88, extending around the exterior surface of the bucket structure 80 to terminate at two ends located on the front side 84. Thus, in this example, the recess 106 includes one or more grooves formed on the front side 84, i.e., the side of the exterior surface from which the bang hook 102 extends outward. Other examples may, for instance, include individual grooves on respective sides or faces, or a groove that runs the entire periphery or circumference of the bucket structure 80.

The wire form loop 104 includes a hook extension 108 that bends outward from the front side 84 at each end of the groove 106. The extension 108 includes a continuous, wire form loop or path having a pair of arms 110 that extend laterally forward and generally within the plane of the loop 104, before turning or bending downward at an elbow to form an L-shaped catch 112 of the hook. When viewed from the front, the wire form path of the extension 108 is U-shaped (see, e.g., the elevational view of FIG. 3). In this case, the catch 112 includes a cross member 114 to complete the loop, although the configuration and construction of the catch 112 or the hook extension 108 may vary from the example shown. The cross member 114 and a link 116 running between the arms 110 along the front side 84 may provide structural rigidity and robustness by not allowing the wire form loop 104 to deform and disengage from the groove 106 in an undesirably easy manner. In other cases, the arms 110 need not be spaced from one another as shown, such that the extension 108 may have or form a variety of hook or bracket shapes that involve a cantilevered, L-shaped, or other projection of a wire form or other nature, including shapes of a non-continuous or non-loop nature.

Notwithstanding the links or cross members 114, 116, the hang hook 102 is removably coupled to the bucket structure 80 to facilitate cleaning, storage, and transport. As shown in FIG. 7, the wire form loop 104 of the exemplary tote 22 described above may be disengaged from, and recaptured within, the groove 106 as desired. To remove the hang hook 102 from the tote 22, a user pulls downward on the loop 104, sliding it over the bucket structure 80. To this end, the bucket structure 80 may taper inward from the head 100 or otherwise have a relatively smaller periphery. Once removed, the loop 104 can be transported separately from the bucket structure 80, thereby allowing the bucket structure 80 to be transported, cleaned, or stored in an efficient and convenient manner. To re-engage the hang hook 102 and the bucket structure 80, a user may slide the wire form loop 104 upward until it enters the groove 106 in the rear side 86, and then grasp the bucket structure 80 (for instance, the rim 98) and extension 108 as shown in FIG. 7 to snap the hang hook 102 into position.

The exploded view of FIG. 6 depicts how the hang hook 102 of the exemplary tote 22 may be attached to the bucket structure 80 by sliding it on from the bottom of the tote 22. While FIG. 7 shows how the wire form loop 104 is eventually captured in the groove 106 on the back side 84, it should be noted that the front side 82 (or any other side in an alternative groove configuration) may be engaged first. In any case, FIG. 7 shows that, once captured in a groove on one side, the hang hook 102 can be snapped into place by grasping or engaging the wire form loop 104 on an opposite (or other) side as shown.

With reference again to the example shown in FIGS. 3-6, the tote 22 has a lower lift handle 120 in addition to the upper, carrying handle 30. The lower lift handle 120 helps avoid contamination of the ice by minimizing the possibility of dirt and other contamination spreading from the floor. Generally speaking, the lower lift handle 120 includes a recessed grip spaced or elevated from the lowest portion of the bottom side 92. While the FDA regulations and other guidelines prohibit or discourage setting ice buckets on the floor, this aspect of the disclosed totes addresses the possibility for contamination in the event that the tote 22 is placed on the floor or otherwise comes in contact with a contaminated surface. The lower lift handle 120 also helps reduce back strain and avoid other injuries resulting from lifting the tote 22 over one's head in order to fill the ice chamber on a top of a self service beverage station. With one hand on the upper, carrying handle 30 and the other hand on the lower lift handle 120, a user can grasp both the top and bottom of the tote 22 to easily lift the tote 22 to a desired height. The above-described hang hook may also then be used to hang the tote 22 on the edge of the beverage station (or ice machine) as a temporary resting position or as a pivot to dump the ice into the ice chamber. In these ways, the disclosed totes 22 provide a much more ergonomic ice transport process.

The lower lift handle 120 of the exemplary tote 22 is best shown in FIG. 5. In this case, the junction between the front side 84 and the bottom side 92 includes a cutout section 122 that forms a grip surface 124 recessed from both a bottom surface 126 and a front face 128. In practice, the cutout section 122 may correspond with a depression molded into the bottom and front sides 84, 92 of the bucket structure 80. In any case, the front side 84 may taper inward from the front face 128 as shown to provide a smooth transition rather than a sharp edge. The bottom side 92 may similarly taper upward from the bottom surface 126 to form a recess 130 to accommodate a user's fingers as the grip surface 124 is grasped by the palm of a hand. The shape, size, position, configuration, and other characteristics of the recessed grip may vary from the example shown and remain elevated from the bottom surface 126 to avoid any undesirable contaminating contact or rest surfaces when the tote 22 stands upright.

Another feature of the exemplary tote 22 involves the carrying handle 30, which is pivotably coupled to the exterior surface of the bucket structure 80 along the lateral sides 88. In this example, the handle 30 is removable or detachable from the bucket structure 80 as shown in FIG. 6. In this example, the handle 30 includes a wire 132 that forms an adjustable ring or loop 134 that engages a pair of handle hubs 136 disposed on the lateral sides 88 (or the head 100). Because one end of the ring 134 is free, the ring 134 is resiliently deformable to allow for repeated detachment and attachment in connection with storage, transport, cleaning, and other operations. The ring 124 may be configured, however, such that the force used to overcome the spring constant of the ring 134 may be not insignificant. As a result, the handle 30 cannot be detached too easily or unintentionally. To that end, the hubs 136 may include a circular groove 138 (FIGS. 3 and 4) between an outer cap or other end 140 of the hub 136 and the bucket structure 80. As a result, the ring 124 cannot disengage the hub 136 simply by sliding laterally outward. The construction and configuration of the handle hubs 136 may vary from the example shown, such that a variety of bosses or projections from the lateral sides 88 may be used to allow the handle 30 to rotate.

The handle 30 may also include a grip 142 to provide a comfortable position to grasp the handle 30. The grip 142 may be an over-molded component using a soft or rubberized material. This component and other characteristics of the carrying handle 30 may vary considerably from the example shown. For instance, the handle 30 may include molded arms that lead to a latch or clasp differing from the wire-based example described above.

FIGS. 8A and 8B depict the above-described hang feature of the tote 22 in connection with two exemplary ice machines 150, 152. The hang hook 102 of the tote 22 allows the tote 22 to engage the ice machines 150, 152 in a manner that makes loading ice into the tote 22 more convenient, less prone to injury, and without contamination from the floor. In either case, the tote 22 is positioned where the ice is being scooped, which can help reduce back strain for the user by not forcing the user to bend over each time that he or she wants to put a scoop full of ice into the tote 22. Generally speaking, the hang hook 102 substantially, if not entirely, eliminates any gap between the tote and the ice machine across the width of the tote. The engagement of the hang hook ensures that, for any type of ice machine, the tote is elevated to a correct, appropriate height. This feature greatly reduces the need to bend over every time a scoop of ice is put in the tote.

Both of the ice machines 150, 152 are generally equipped with a front access bin 154. The ice machine 150, 152 differ, however, in that one has a front panel 156 that slopes away from an edge 158 of the access bin 154, while the other has a front panel 160 that extends vertically downward from the edge 158 of the access bin 154. In either case, the hang hook 102 engages the edge 158 to position the tote 22 at a convenient level near the opening of the front access bin 154. To that end, the hang hook 102 (or, more specifically, the catch 114) may engage a frame (not shown) defining the opening. More generally, the hang hook 102 allows the tote 22 to be positioned very closely to, if not against, the front panels 156, 160, as shown.

FIGS. 8A and 8B also depict one of the benefits of the angled opening 82 of the tote 22 directed to the safe transfer of ice from the machine to the tote with reduced spilling. Furthermore, the angled opening 82 provides a convenient loading backstop even when the ice machine presents a front pane that angles away from the opening, as shown in the example of FIG. 8A. In this way, the hang hook 102 allows the tote 22 to hang on different types of machines while still providing a good angle on the opening of the tote 22 to minimize spills.

While the hang hook 102 can provide support to keep the tote 22 upright on any machine, the hang hook 102 may utilize additional clamping or insert components to help maintain a secure fit, a specific position, etc. Exemplary components are described below with a number of alternative totes. These components, including in some cases the hang hook 102, may be configured to remain clipped, clamped or otherwise attached to the ice machine instead of the tote. However, due to the wide range of ice machine manufacturers, this approach might involve components specifically configured for different machine designs.

As shown in FIGS. 8A and 8B, as well as in the example of FIG. 4, the tote 22 may also include an additional hang hook or bracket 170 for storage, drainage, drying, and other non-use periods. The hook 170 allows the tote 22 to hang upside down for drainage after use. As shown in FIG. 4, the hook 170 may be shaped as a bracket or elongated hook with a length (or width) to provide greater durability and robustness.

Figure 9:
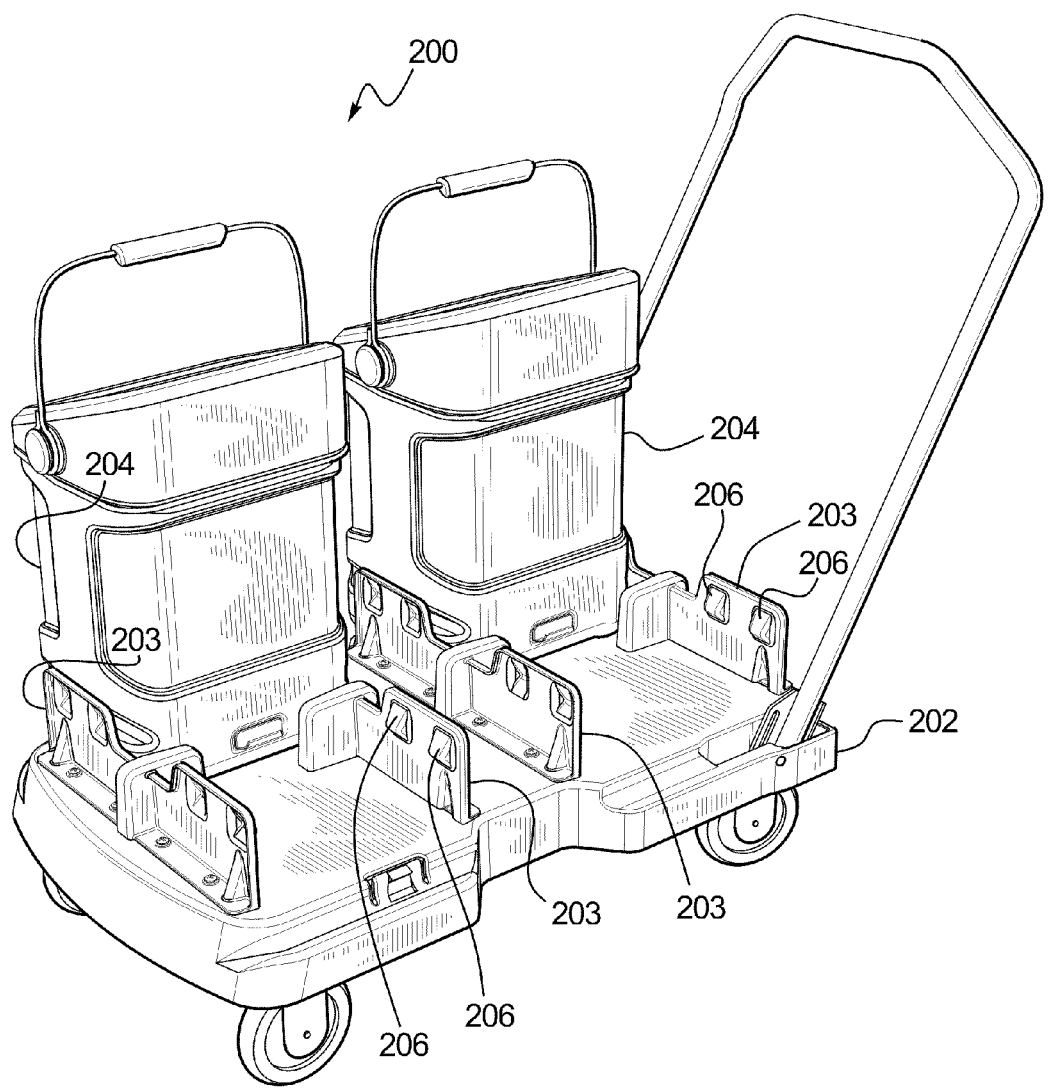
FIG. 9 is a perspective view of an alternative ice transport system having a cart with one or more exemplary adapters that form a bucket retention structure in accordance with one or more aspects of the disclosure.

FIG. 9 depicts an ice transport system 200 constructed in accordance with an alternative embodiment. The system 200 includes an ice transport cart 202 with a flat bed similar to the one described above. Instead of the above-described retention rails, the retention structures are now a set of T-shaped adapters 203 that together form an adaptable or adjustable interface for securely positioning a number of ice totes or buckets 204 on the platform. Each adapter 203 is mounted on the cart and configured to secure the positioning of two adjacent totes. The totes 204 may be similar to the totes 22 described above in a number of ways, including the indentations or detents 64 formed in the lateral sides. In this case, the indentations are configured such that the totes 204 form a pressure fit with projections 206 of the adapters 203. To allow the totes 204 to engage the projections 206, the projections 206 or other component of the adapters 203 may flex or otherwise adjust or adapt while the totes 204 snap into position.

One way in which the embodiment of FIG. 9 is similar to the above-described examples involves the orientation of the adapters 203 on the platform. In this case, the adapters 203 are disposed laterally across the width of the cart such that the lateral sides of the cart remain open and free of any obstructions. In this way, access to the platform via the lateral sides makes loading and unloading the totes 204 easier and less prone to injury.

Figure 10:
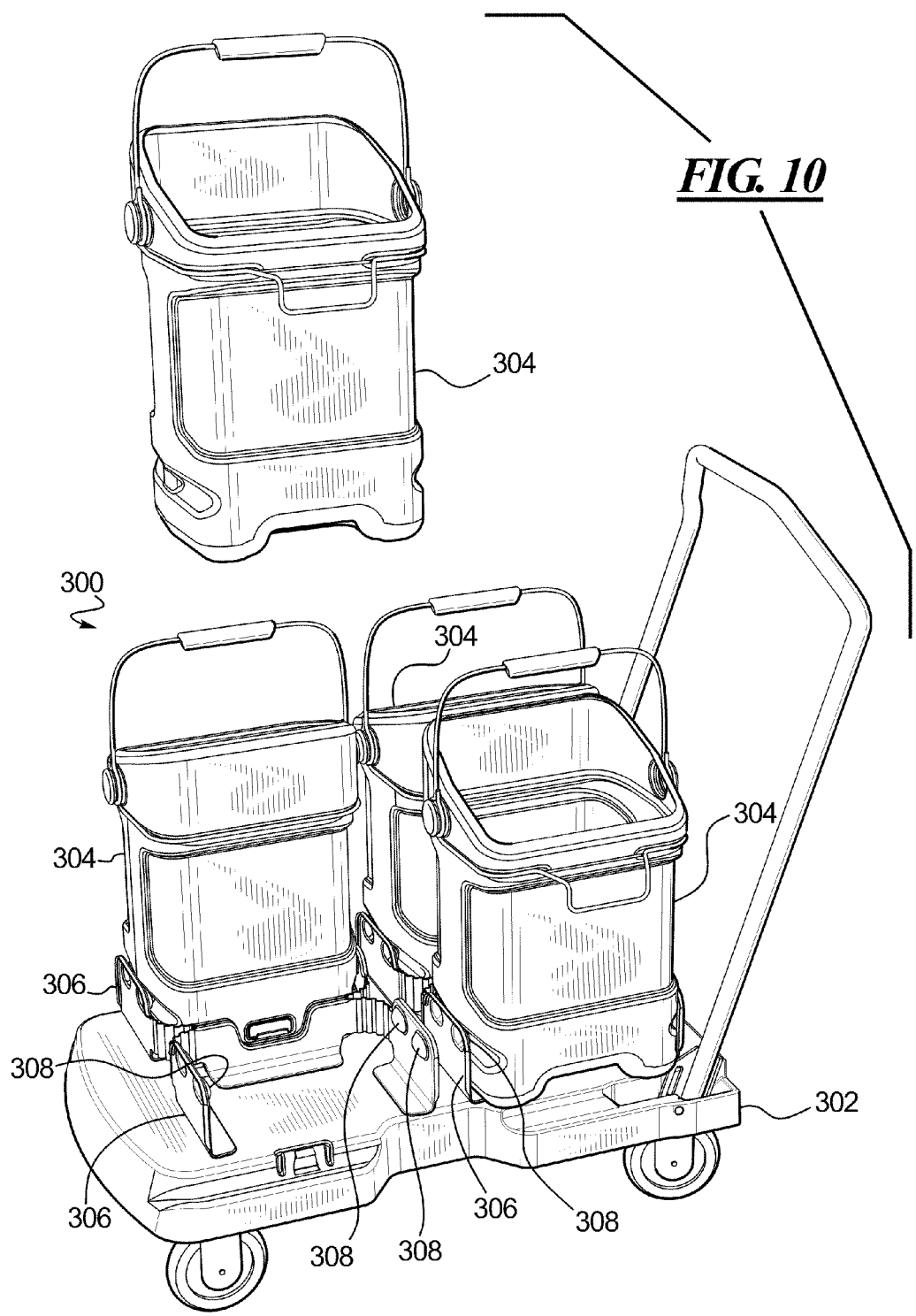
FIG. 10 is a perspective view of a yet another ice transport system having a cart with multiple bucket retention adapters or structures in accordance with an alternative embodiment.

FIG. 10 depicts an ice transport system 300 constructed in accordance with another alternative embodiment. The system 300 includes an ice transport cart 302 with a different adjustable interface for loading ice totes or buckets 304. In this case, the adjustable interface includes a number of U-shaped adapters 306 removably mounted on the cart 302 to, in turn, securely mount respective totes 304 as shown. The disclosed adapter can be molded as a flat part as shown or could be molded in the ready to install U-shape. If molded flat, the adapter may be flexible and flexed or bent into the "U" shape. Rather than use bolt fasteners, the adapters 306 may be provided with connectors that snap into slots on the flat bed of the cart.

The totes 304 are similarly configured to snap into the adapters 306 via a pressure fit with detents or projections 308 on the sides of the adapters 306. This approach allows each tote to be held individually and snugly in place, but also be attached and removed from the cart easily by the user via the open lateral sides as described above.

Figure 11:
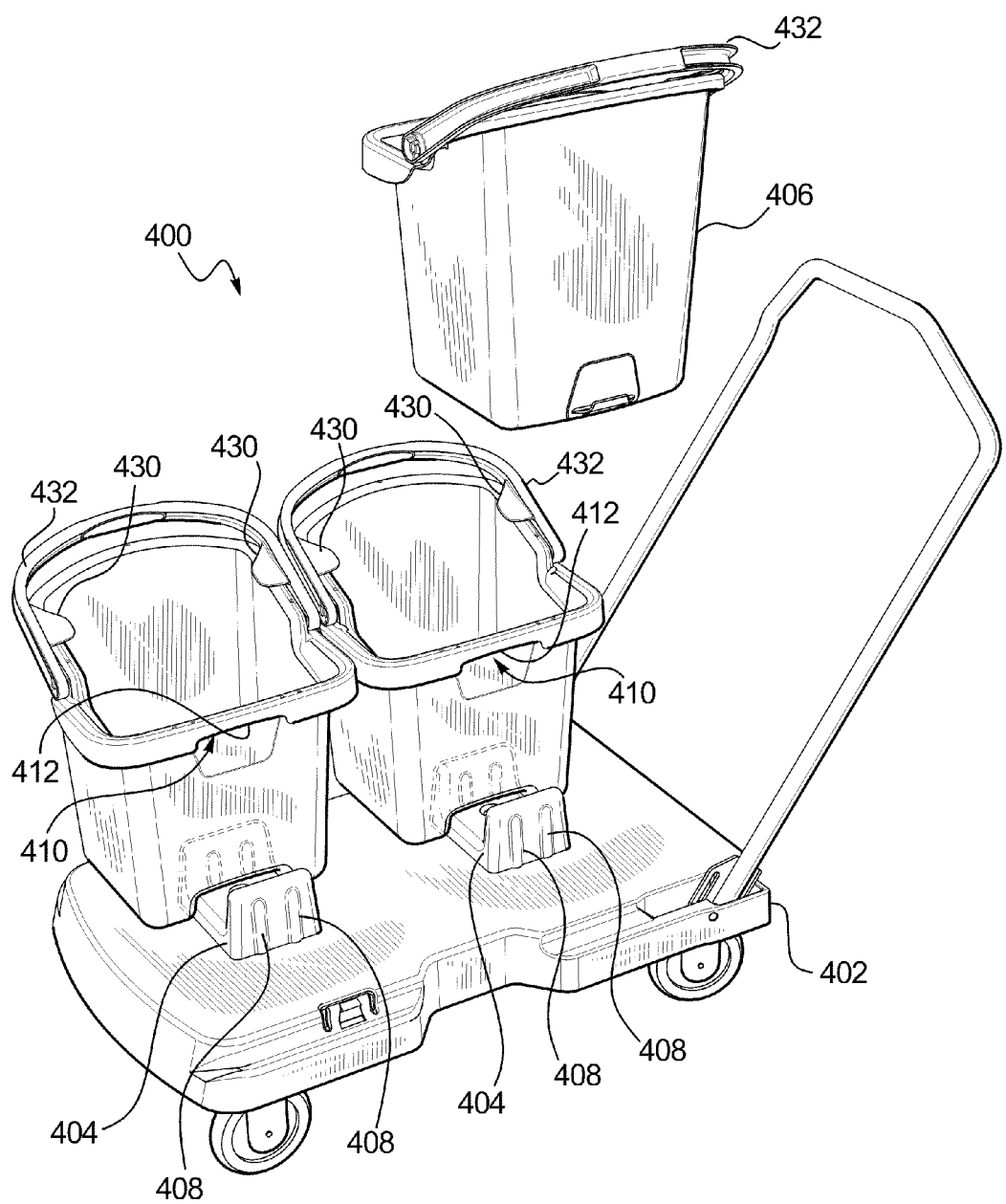
FIG. 11 is a perspective view of still another ice transport system having a cart with multiple bucket retention adapters or structures in accordance with another alternative embodiment.

FIG. 11 depicts another ice transport system 400 constructed in accordance with yet another alternative embodiment. In this case, a cart 402 may again include a flat bed and platform similar to those described above, but be equipped with U-shaped adapter posts 404 mounted or otherwise attached to the flat bed to hold totes 406 in position. The adapter posts 404 include ribs 408 to engage the totes 406 by means of a pressure fit similar in principal to the examples described above. However, in this case, the pressure fit involves a different area or region of the exterior surface of the totes 406. While the totes 406 depicted in FIG. 11 are different than those described above, any of the disclosed totes may be utilized with the adapter posts 404, inasmuch as the lower handle recess area described above may be used to receive the posts. Each adapter 404 can secure two totes 406 face to face as the twin towers on each side of an adapter post fit into the lower handle described above.

The totes 406 in this example differ in a number of ways from the examples described above. For instance, the above-described ice machine hang feature is supported by an overhang recess 410 in a front side of the tote 406 (as opposed to the groove recess described above). The recess forms a hang edge 412 with a downward turn that makes an elongated hook shape. The hang edge 412 is then, in one example, engaged by a removable hang hook or clip (FIGS. 13A, 13B) configured to also attach to the ice machine. As a result, the bucket can hang on the edge of the ice machine for filling, as described in the above examples.

Figure 13A:
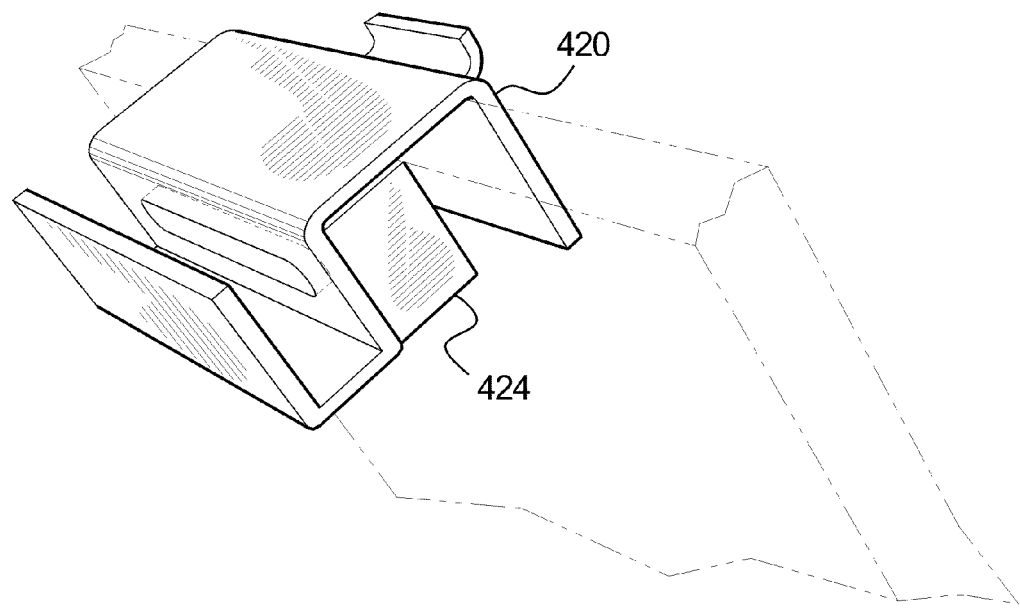
FIGS. 13A and 13B are perspective views of alternative hooks configured for hanging the buckets of the ice transport systems of FIGS. 9-12 on an ice machine access panel in accordance with one aspect of the disclosure.
Figure 13B:
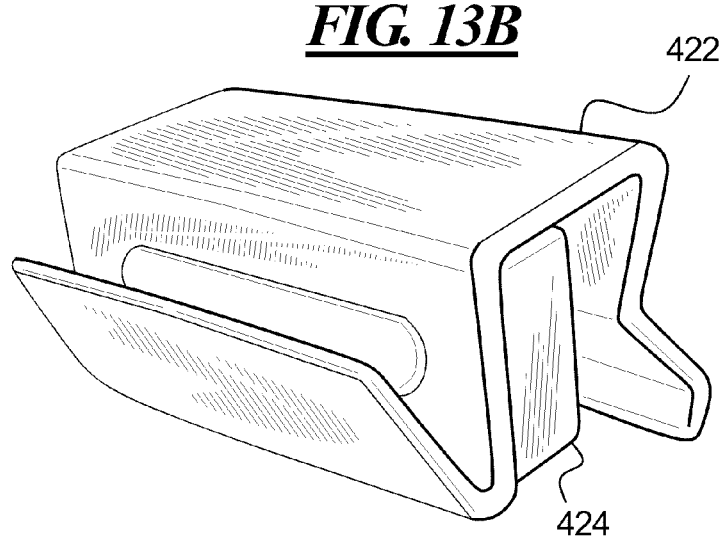

The adaptive aspect of the clip can ensure that the tote hangs snug against the face of the bin in much the same manner as described above. This reduces spilling of ice as it is scooped from the machine for the reasons set forth above. Examples of suitable adapter clips are shown in FIGS. 13A and 13B, although a wide variety of S-hooks or clips may be used. A S-hook 420 (FIG. 13A) may be an adhesive hook that bonds or screws to the front of the ice bin. The other shown in FIG. 13B includes a semi-universal clip 422 that clips over the edge of the ice bin in a similar way to a binder clip or a spring clip. In each case, the hook or clip may be customized or adjusted for an ice machine or bin through an insert or shim 424 disposed within a hole or otherwise secured in place. Alternatively, unique hook or clip profiles may be constructed for each ice machine manufacturer.

The totes 406 may have non-nesting tabs 430 extending from a handle 432 or other component to prevent users from nesting buckets. The tabs create interference with the bottom of a second bucket and can work in any handle orientation.

Figure 12:
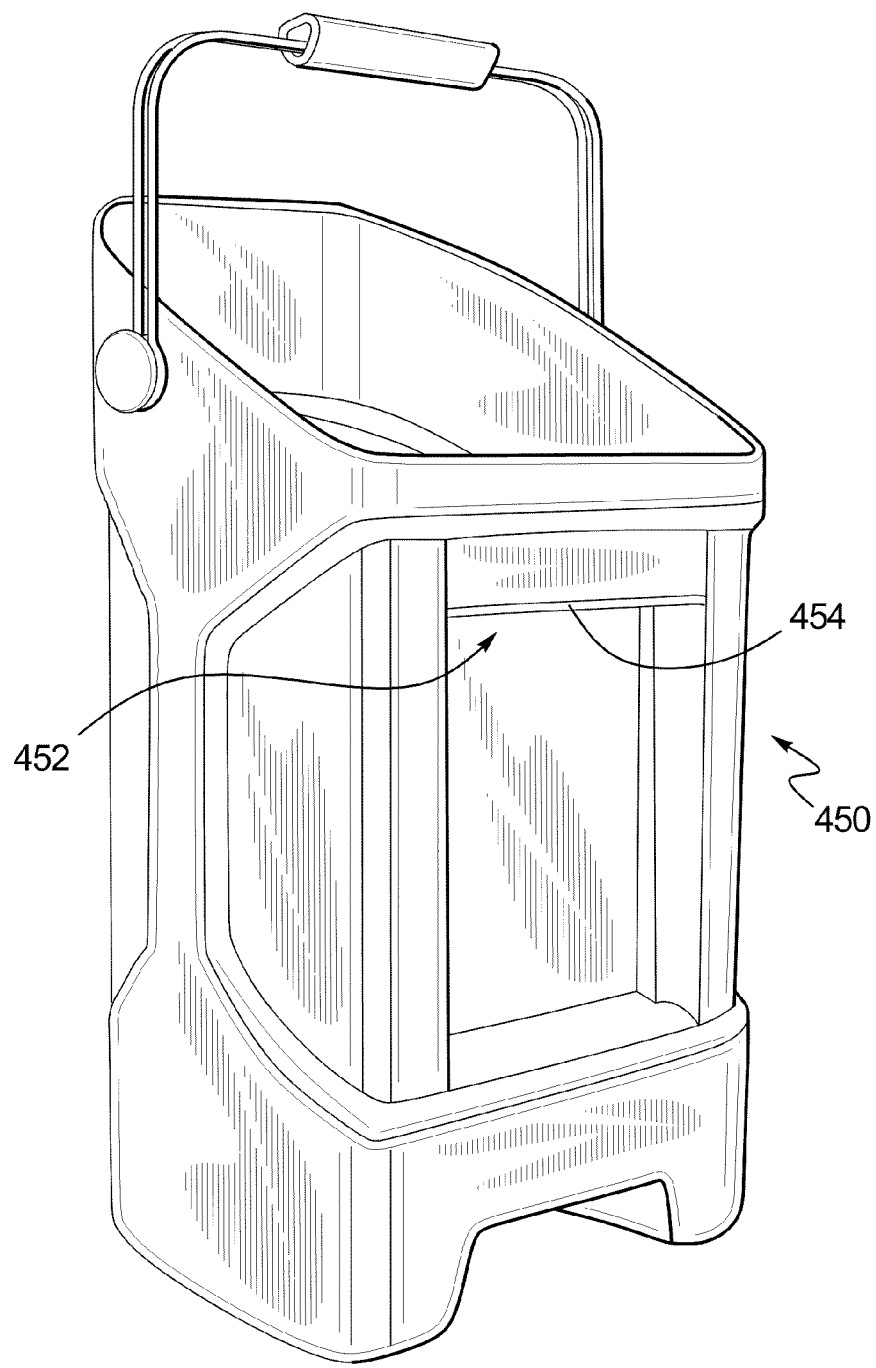
FIG. 12 is a front, perspective view of an alternative ice tote or bucket configured for use with the cart and ice transport system of FIG. 11.

FIG. 12 depicts an alternative ice tote or bucket 450 suitable for use with the cart shown in FIG. 11. The tote 450 is similar to the one described in connection with the embodiment of FIG. 11 in the sense that the hang hook recess includes or involves an overhang 452 and hang edge 454 to be engaged by an S-hook or other removable hang hook.

Figure 14A:
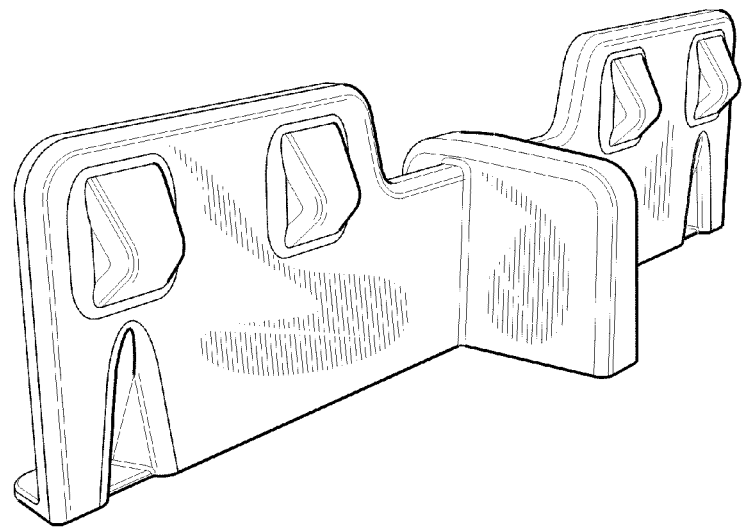
FIGS. 14A-14C are perspective views of the bucket retention adapters or structures for mounting on the carts of the alternative ice transport systems of FIGS. 9-11.
Figure 14B:
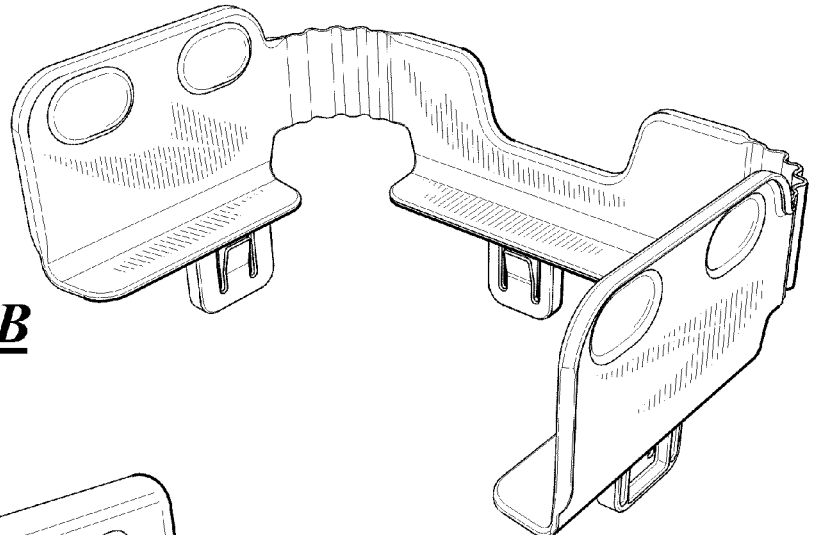
Figure 14C:
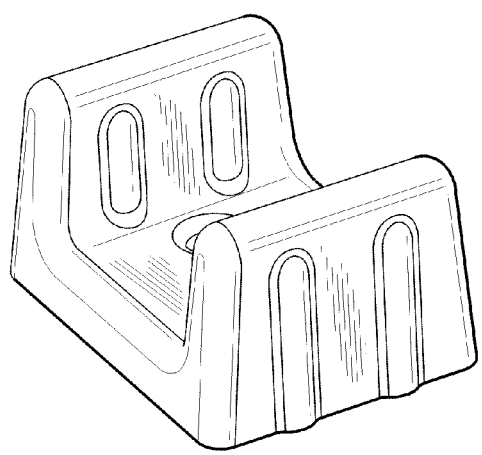

FIGS. 14A, 14B, 14C depict the above-described cart adapters in greater detail. One or more of these adapters may be used in combination with any of the above-described retention schemes such that, for instance, the retention rails described above may be used in conjunction with one or more of the adapters to securely position the totes on the platform.

FIG. 15 depicts an ice transport system 500 with an alternative cart 502 and an alternative bucket or tote 504. As with the carts described above, the cart 502 in this example is a dedicated structure to be used to transport multiple totes 504. The cart 502 is foldable or collapsible for ease of storage during periods of non-use. In this case, the cart 502 has one or more central beams 506 or other cross members that allow the totes 504 to hang from a hook edge 508 thereof, opposite each other and side by side, as well as off the floor to help prevent contamination. The central beam 506 may be constructed from one or more rods or a variety of other structures.

The tote 504 has several unique features including an integrated lid 510 to reduce cross-contamination risk. The lid 510 is movably attached to the bucket and, thus, will not get lost. Each tote 504 has one handle placed on the lid and one on the bottom rear of the bucket. As a user lifts and rotates the bucket in a pouring motion, the relationship between the handles and the center of gravity changes. In the pouring orientation, the weight of the ice wants to pull the bucket open, exposing the ice and allowing it to be dispensed. This opening motion feels controlled by the user because of the orientation of the handles. Since the opening and closing of the lid is controlled in the ice pouring action, an additional step is not required to remove a lid, find a place to set that lid, replace the lid, etc. For the foregoing reasons, the lid 510 opens as an "automatic" motion as part of the pouring action.

The hang edge hook 508 may also be used for hanging the totes 504 on the edge of an ice machine during a filling operation. To this end, the leading edge of the bucket has a downward turn that makes a long hook shape.

The tote 504 employs ergonomic weight distribution. Rather than force a user to carry an ice bucket with an arm extended away from his or her body core, the tote design keeps the center of gravity of the tote as centered as possible on his or her own center of gravity. This eases back strain and helps prevent health issues related to carrying weight.

The orientation of the handle grip on the lid may be opposite the center of gravity of the pivot point (where the lid and bucket rotate on each other) in such a way that when a user holds the bucket by the handle, the weight of the bucket helps to keep the lid shut. The top handle may be as close to the top center of the lid as possible so that a user can approach the bucket from either side. This may also help keep the handle directly above the center of gravity of the bucket. The edge hook 508 should be robust so as not to break during normal use. The edge hook 508 in this example may hang on either existing ice machine bins, or an adapter may be used to retro-fit the edge hook to non compatible surfaces. The bucket lid 510 may have a flat face that is directly above the edge hook when the bucket is closed. The height of this face may be approximately 2 inches and run the width of the bucket. As the lid rotates back to the open position, this face, as part of the lid, rotates into place above the rear top edge of the bucket. This face, in this orientation, becomes a deflector that helps to direct the flow of ice into the interior of the bucket.

The cart 502 may be constructed of plastic or metal. For instance, metal may be used instead of plastic on the handle sides. This would allow for a thinner profile that would in turn allow the buckets to be nested closer together side by side. The handles in both the lid and bucket could be made as separate parts or as molded as part of the lid or bucket. The bucket need not have a lid, but instead could have a handle that operates in a similar fashion to provide the pouring action described earlier in this document.

Each of the above-described totes may be optionally equipped with a lid. In each example described above, the lid may be configured to cover the opening by gravity rather than any fastener or fastening technique. In some cases, the lid may have a hole configured to receive a hook used to hang the lids for drying.

Each of the above-described totes may be a blow-molded, polycarbonate structure. This technique is available because the bucket structures should not nest and minimal wall thickness is desirable to keep the weight of the tote as low as possible for compliance with regulations restricting the weight a user can carry. OSHA regulations state that an employee be asked to carry a maximum amount no greater than 50 lbs. Thus, the totes described herein may be sized and otherwise configured to have a 25 lb. capacity, assuming that common practice is to carry two of these buckets, one on each side.

Blow-molding manufacturing techniques and materials allow the totes described above to be made of one or more translucent materials having the properties to withstand the required temperature and durability criteria. An injection molded opaque version of the tote may also be used. However, it has been found that translucent totes are more desirable because the totes are then seen distinctly as "ice only" and, thus, less likely to be mistaken for a waste can, mop bucket, etc. Users also like clear totes because it is easier to determine that the tote is clean.

Alternative manufacturing options include injection molding and the like. However, to injection mold polycarbonate, the wall thicknesses of the totes may be thicker for manufacturability. The increased wall thicknesses may then add to both weight and cost. The extra weight may be a disadvantage as one would then be trading plastic weight for ice volume.

In some cases, the buckets may be constructed of a durable plastic, preferably HDPE or similar material. One or more components of the totes may include a clear area, preferably at or near a front or top side or surface to allow a user to see the contents during use.

In some cases, the surfaces, handles, and other components of the disclosed totes have a minimum ⅛ inch radius to meet NSF clean-ability standards.

The totes may be annealed to reduce manufacturing stresses that could cause the part to crack or craze later while dishwashing or the like. Any one or more of the components described above with the disclosed totes may be integrated to any desired extent, including or involving, for instance, insert molding, welding, and the like.

The totes described above generally address a number of challenges presented by the ice transport context. Comfortable and convenient handles and grips improve handling, making the filling and dispensing of ice more ergonomic. The carrying handles described above, while removable, remain not too easily detached. Also, the totes have an upside down hang hook that is more durable. Additionally, the totes may be sized to fit in a dishwasher. In addition, the totes enhance user safety by reducing ice spillage on the floor and reducing back strain during use. The disclosed totes further reduce the possibility for cross-contamination. Still further, the totes are not nestable, but are dishwasher safe. The tote handles are recessed for protection. The totes can help to enhance worker and kitchen productivity by improving filling accuracy and speed, and by improving pouring accuracy and speed. Each of the totes has an angled top that acts as a backboard when filling to reduce spillage, to act as a pour spout when pouring ice, and to allow the totes to hang from ice machine at an angle and still be easy top fill. The totes have the ability to hang on the edge of the ice machine, reducing back strain to fill.

The above-described totes and carts are generally designed to form a part of an ice transport system directed to making the ice handling and transport processes safer and easier. To those ends, the totes and carts described above are configured to be used in concert as shown in the drawing figures and described above. Furthermore, the disclosed totes can serve as a core unit to a complete line of products to address ice safety, including scoops, shovels, and large volume bins.

Although certain systems and devices have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. An ice transport system comprising:
   a cart comprising a bed and a plurality of retention structures mounted on the bed, the bed comprising a platform with a plurality of sides;
   a plurality of ice totes arranged on the platform and contained on the platform by the plurality of retention structures;
   wherein the plurality of retention structures are configured and positioned relative to the platform to contain the plurality of ice totes on the platform while leaving an access side of the plurality of sides open for loading and unloading the plurality of ice totes,
   wherein the plurality of retention structures form an adjustable retention structure movable between a first in-use orientation and a second in-use orientation, the second in-use orientation being configured to secure a different number of the plurality of ice totes on the platform than the first in-use orientation,
   wherein the adjustable retention structure comprises a pair of retention rails configured to pivot between peripheral and interior positions,
   wherein each retention rail is disposed in the peripheral position in the first in-use orientation, and wherein a first rail of the pair of retention rails is disposed in the interior position and a second rail of the pair of retention rails is disposed in the peripheral position to secure the number of the plurality of ice totes between the pair of retention rails in the second in-use orientation.

2. The ice transport system of claim 1, wherein one of the pair of retention rails comprises a rail that extends along the access side.

3. The ice transport system of claim 1, wherein each ice tote comprises a detent configured for cooperative engagement with the plurality of retention structures.

4. The ice transport system of claim 1, wherein the plurality of retention structures comprises a plurality of footer walls mounted to the platform.

5. The ice transport system of claim 1, wherein the plurality of retention structures comprises a pair of walls mounted on the platform along opposing sides of the plurality of sides with a rail of the pair of retention rails pivotably attached between the pair of walls and positioned along the access side.

6. The ice transport system of claim 1, wherein the pair of retention rails form an adjustable interface configured to secure a varying number of the plurality of ice totes on the platform.

7. A cart for transporting a plurality of ice totes, the cart comprising:
   a bed comprising a platform configured to carry the plurality of ice totes; and
   an adjustable retention structure mounted on the bed and configured to engage the plurality of ice totes at a position spaced from the platform to contain the plurality of ice totes on the platform;
   wherein the adjustable retention structure is movable between a first in-use orientation and a second in-use orientation, the second in-use orientation being configured to secure a different number of the plurality of ice totes on the platform than the first in-use orientation,
   wherein the adjustable retention structure comprises a pair of retention rails configured to pivot between peripheral and interior positions,
   wherein each retention rail is disposed in the peripheral position in the first in-use orientation, and wherein a first rail of the pair of retention rails is disposed in the interior position and a second rail of the pair of retention rails is disposed in the peripheral position to secure the number of the plurality of ice totes between the pair of retention rails in the second in-use orientation.

8. The cart of claim 7, wherein the adjustable retention structure comprises a pair of walls mounted on the platform between which the pair of retention rails are pivotably attached.

9. The ice transport system of claim 1, wherein each ice tote comprises:
   a bucket having an exterior surface with a recess;
   a carrying handle pivotably coupled to the exterior surface of the bucket; and
   a hang hook removably disposed within the recess and configured to extend outward from the exterior surface of the bucket.

10. The ice transport system of claim 9, wherein the hang hook comprises a wire form loop captured within the recess.

11. The ice transport system of claim 9, wherein the recess comprises a groove in which the hang hook is captured.

12. The ice transport system of claim 9, wherein the hang hook comprises an arm that extends outward from the exterior surface and a catch that extends downward from the arm.

13. The ice transport system of claim 9, wherein the recess comprises a groove and the hang hook comprises a wire form loop captured in the groove.

14. The ice transport system of claim 9, further comprising a grip disposed in a further recess in the exterior surface of the bucket.

15. The ice transport system of claim 14, wherein the further recess is formed in a bottom side of the exterior surface of the bucket.

16. The ice transport system of claim 9, wherein the recess is formed on a side of the exterior surface from which the hang hook extends outward.

17. The ice transport system of claim 9, wherein the hang hook comprises a wire form loop having a pair of arms that extend outward from the exterior surface of the bucket.

18. The ice transport system of claim 1, wherein each ice tote comprises:
   a bucket having an exterior surface;
   a first handle pivotably coupled to the exterior surface for carrying the bucket; and
   a second handle comprising a grip area in a recess formed in a bottom side of the exterior surface such that the grip area is elevated relative to the bottom side.

19. The ice transport system of claim 18, wherein the recess is further formed in a side face of the exterior surface.

20. The ice transport system of claim 18, wherein the exterior surface includes an elevated back wall configured to define an angled opening of the bucket.

21. The ice transport system of claim 18, wherein the first handle comprises a wire form ring that detachably engages a projection of the exterior surface.

22. The ice transport system of claim 18, further comprising a wire form hang hook disposed within a groove of the exterior surface and configured to extend outward from the exterior surface.

* * * * *